United States Patent
Wu et al.

(10) Patent No.: US 12,052,581 B2
(45) Date of Patent: Jul. 30, 2024

(54) METHOD AND DEVICE FOR WIRELESS COMMUNICATION ON UNLICENSED SPECTRUM IN UE AND BASE STATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 110 days.

(21) Appl. No.: 17/860,061

(22) Filed: Jul. 7, 2022

(65) Prior Publication Data

US 2022/0345898 A1    Oct. 27, 2022

Related U.S. Application Data

(63) Continuation of application No. 16/937,573, filed on Jul. 23, 2020, now Pat. No. 11,418,966, which is a
(Continued)

(30) Foreign Application Priority Data

Jan. 29, 2018    (CN) .......................... 201810084834.3

(51) Int. Cl.
*H04L 12/28*    (2006.01)
*H04W 16/14*    (2009.01)
(Continued)

(52) U.S. Cl.
CPC ........... *H04W 16/14* (2013.01); *H04W 24/08* (2013.01); *H04W 72/0446* (2013.01);
(Continued)

(58) Field of Classification Search
CPC .............. H04W 16/14; H04W 72/046; H04W 72/0453; H04W 72/0446; H04B 7/0695; H04B 17/318; H04L 5/006
(Continued)

(56) References Cited

U.S. PATENT DOCUMENTS

| | | | | |
|---|---|---|---|---|
| 2017/0353984 | A1* | 12/2017 | Abdallah | .............. H04L 5/0055 |
| 2020/0336917 | A1* | 10/2020 | Zhang | .................. H04B 7/0617 |
| 2021/0083746 | A1* | 3/2021 | Huang | ...................... H04L 1/00 |

FOREIGN PATENT DOCUMENTS

| | | |
|---|---|---|
| CN | 103686827 A | 3/2014 |
| CN | 106465288 A | 2/2017 |
| CN | 106465431 A | 2/2017 |
| CN | 106664723 A | 5/2017 |

(Continued)

OTHER PUBLICATIONS

CN201810084834.3 1st Office Action dated Dec. 3, 2020.
(Continued)

*Primary Examiner* — John Pezzlo

(57) ABSTRACT

The present disclosure a method and a device in a UE and a base station used for wireless communications. A first node performs Q energy detection(s) on a first sub-band to obtain Q detection value(s); and determines based on the Q detection value(s) that a first radio signal is transmitted on the first sub-band at a first instant of time; performs P energy detection(s) on a second sub-band to obtain P detection value(s); and transmits or drops transmitting a second radio signal on the second sub-band at the first instant of time; each of the Q energy detection(s) is associated with a first antenna port group; when each of the P energy detection(s) is associated with the first antenna port group, the P is P1, otherwise the P is P2. The present disclosure is advantageous in ensuring fairness in the contention for spectrum occupancy in multicarrier-supporting Unlicensed Spectrum communications.

20 Claims, 18 Drawing Sheets

Related U.S. Application Data continuation of application No. PCT/CN2019/071529, filed on Jan. 14, 2019.

(51) Int. Cl.
- *H04W 24/08* (2009.01)
- *H04W 72/0446* (2023.01)
- *H04W 72/0453* (2023.01)
- *H04W 72/1273* (2023.01)
- *H04W 74/0808* (2024.01)

(52) U.S. Cl.
CPC ... *H04W 72/0453* (2013.01); *H04W 72/1273* (2013.01); *H04W 74/0808* (2013.01)

(58) Field of Classification Search
USPC .............................. 370/252, 329, 430, 442
See application file for complete search history.

(56) References Cited

FOREIGN PATENT DOCUMENTS

| WO | 2016130684 A1 | 8/2016 |
|----|---------------|--------|
| WO | 2017034237 A1 | 3/2017 |
| WO | 2017076219 A1 | 5/2017 |

OTHER PUBLICATIONS

CN201810084834.3 First Search Report dated Nov. 25, 2020.
Huawei et al. "Coexistence and Channel Access for NR-based Unlicensed Band Operation" 3GPPTSGRAN WGIMeeting 90bis R1-1717914, Oct. 13, 2017(Oct. 13, 2017).
Ericsson. "Draft CR on Multi-carrier LBT for Uplink Transmission" 3GPPTSG-RANMeeting #87 R1-1612769, Nov. 18, 2016(Nov. 18, 2016).
ISR in application No. PCT/CN2019/071529 dated Feb. 16, 2019.

* cited by examiner

Transmitting beam corresponding to all antenna port(s) comprised in given antenna port group Receiving beam corresponding to given energy detection

METHOD AND DEVICE FOR WIRELESS COMMUNICATION ON UNLICENSED SPECTRUM IN UE AND BASE STATION

CROSS REFERENCE TO RELATED APPLICATIONS

This application is a continuation of the U.S. patent application Ser. No. 16/937,573, file on Jul. 23, 2020, which is a continuation of International Application No. PCT/CN2019/071529, filed Jan. 14, 2019, claims the priority benefit of Chinese Patent Application No. 201810084834.3, filed on Jan. 29, 2018, the full disclosure of which is incorporated herein by reference.

BACKGROUND

Technical Field

The present disclosure relates to methods and devices in wireless communication systems, and in particular to a method and device in a wireless communication system that supports data transmissions on Unlicensed Spectrum.

Related Art

Application scenarios of future wireless communication systems are becoming increasingly diversified, and different application scenarios have different performance demands on systems. In order to meet different performance requirements of various application scenarios, the study item of access to Unlicensed Spectrum under New Radio (NR) was approved at the 3rd Generation Partner Project (3GPP) Radio Access Network (RAN) #75th plenary session, which is expected to be completed in R15 version and a work item (WI) will be initiated in R16 to standardize relevant techniques. To ensure compatibility with other access technologies on Unlicensed Spectrum, in Long Term Evolution (LTE) License Assisted Access (LAA) project, a transmitter (i.e., a base station or a User Equipment) is supposed to perform Listen Before Talk (LBT) before transmitting data on Unlicensed Spectrum to avoid interference to other ongoing wireless transmissions on Unlicensed Spectrum. The LTE system defines backoff-including Cat 4 LBT and backoff-excluding Cat 2 LBT.

If a User Equipment (UE) can work on multiple carriers deployed on Unlicensed Spectrum, the LTE system supports selecting one of the multiple carriers for performing Cat 4 LBT, so that other carriers, based on the fact that the selected carrier has passed Cat 4 LBT, can start transmitting immediately after passing a brief Cat 2 LBT.

SUMMARY

Inventors find through researches that since massive MIMO is applied in NR systems, the interference in different beam directions may vary significantly, that's why the impact of beam directions needs to be considered when performing LBT. If a specific beam is employed in LBT's performing, the result of the LBT only reflects the channel occupancy in the beam's direction rather than channel occupancy in any other beam direction. Provided that there are multiple carriers, the design of LBT process shall take into consideration the impact of a beam on each carrier. If beams used on the multiple carriers point in different directions, a result of LBT on one carrier is not constructive for determining whether channels on the other carriers are idle.

To address the above problem, the present disclosure provides a solution. It should be noted that the embodiments of a User Equipment (UE) in the present disclosure and characteristics in the embodiments may be applied to a base station if there is no conflict, and vice versa. And the embodiments of the present disclosure and the characteristics in the embodiments may be mutually combined if no conflict is incurred.

The present disclosure provides a method in a first node for wireless communications, comprising:
performing Q energy detection(s) respectively in Q time sub-pool(s) on a first sub-band to obtain Q detection value(s); and determining only based on the Q detection value(s) that a first radio signal is transmitted at a first instant of time on the first sub-band;
performing P energy detection(s) respectively in P time sub-pool(s) on a second sub-band to obtain P detection value(s); and
transmitting a second radio signal at the first instant of time on the second sub-band, or, dropping transmitting the second radio signal at the first instant of time on the second sub-band;
herein, Q is a positive integer; the P detection value(s) is(are) used to determine whether the second radio signal is transmitted at the first instant of time on the second sub-band; and each of the Q energy detection(s) is associated with a first antenna port group; when each of the P energy detection(s) is associated with the first antenna port group, P is P1; when one of the P energy detection(s) is not associated with the first antenna port group, the P is P2; the P1 and the P2 are unequal positive integers; an antenna port group comprises a positive integer number of antenna port(s); the first node is a base station, or the first node is a UE.

In one embodiment, a problem needed to be solved in the present disclosure is that when there are multiple carriers, the design of LBT will be influenced by a beam used on each carrier. If beams employed on the multiple carriers point in different directions, a result of LBT on one carrier cannot be taken as a reference for determining whether channels on the other carriers are idle. As described in the above method, the first node determines whether a result of the Q energy detection(s) can be used to reduce the time occupied by the P energy detection(s) based on whether each of the P energy detection(s) is associated with the first antenna port group. Such practice proposes a solution to the aforementioned problem.

In one embodiment, the above method is characterized in that the first antenna port group reflects a beam employed by the Q energy detection(s) performed on the first sub-band, and the first node determines whether a beam employed by the P energy detection(s) is related to a beam employed by the Q energy detection(s) according to whether each of the P energy detection(s) is associated with the first antenna port. If the two beams are related, then a result of the Q energy detection(s) is constructive for determining whether channels on the second sub-band are idle, therefore, given that the first sub-band is determined to be idle by the Q energy detection(s), the first node will only need to perform energy detection(s) in P1 shorter time sub-pool(s) on the second sub-band; otherwise, the first node will have to perform energy detection(s) in P2 longer time sub-pool(s) on the second sub-band.

In one embodiment, the above method is characterized in that if a beam used for the P energy detection(s) is related to a beam used for the Q energy detection(s), on the condition that the first sub-band is determined to be idle by the Q energy detection(s), the first node need not experience a backoff process when performing the P energy detection(s); otherwise the first node has to include backoff in the performing of the P energy detection(s) to ensure fairness in the contention for occupancy of Unlicensed Spectrum from all directions.

In one embodiment, the above method is advantageous in that the correlation between beams employed on two carriers are considered when determining whether a result of LBT on one carrier can reflect channel occupancy on the other carrier. The LBT based on a beam can only reflect the channel occupancy in the beam's direction, thereby avoiding interferences to ongoing wireless transmissions in other directions on Unlicensed Spectrum and further guaranteeing fairness in the contention for occupancy of the Unlicensed Spectrum from each direction.

According to one embodiment, comprising:
transmitting the first radio signal at the first instant of time on the first sub-band;
herein, the Q detection value(s) is(are) used to determine that the first radio signal is transmitted at the first instant of time on the first sub-band, and each of Q3 detection value(s) among the Q detection value(s) is lower than a first threshold, wherein Q3 is a candidate integer of K1 candidate integer(s), and K1 is a positive integer.

According to one aspect of the present disclosure, wherein the P is the P1, and the P1 is a fixed value, when each of the P detection value(s) is lower than a second threshold, the second radio signal is transmitted at the first instant of time on the second sub-band, otherwise transmitting of the second radio signal at the first instant of time on the second sub-band is dropped.

In one embodiment, the above method is advantageous in that if a beam used for the P energy detection(s) is related to a beam used for the Q energy detection(s), on the condition that the first sub-band is determined to be idle by the Q energy detection(s), the first node only needs to perform a brief Cat 2 LBT not including backoff on the second sub-band before transmitting the second radio signal, thereby increasing the chance of the first node's access to the second sub-band, and also accelerating the access rate onto the second sub-band.

According to one aspect of the present disclosure, wherein the P is the P2, and the P2 is greater than P3, wherein the P3 is a candidate integer of K2 candidate integer(s), when each of P3 detection value(s) among the P detection value(s) is lower than a third threshold, the second radio signal is transmitted at the first instant of time on the second sub-band, otherwise transmitting of the second radio signal at the first instant of time on the second sub-band is dropped, the K2 being a positive integer.

In one embodiment, the above method is advantageous in that if a beam used for the P energy detection(s) is unrelated to a beam used for the Q energy detection(s), then a result of the Q energy detection(s) cannot reflect the channel occupancy on the second sub-band. Therefore, before transmitting the second radio signal, a Cat 4 LBT including backoff is required to be performed on the second sub-band to ensure fairness in the contention for occupancy of the second sub-band with other kinds of equipment.

According to one aspect of the present disclosure, comprising:
operating at least one of a first signaling or a second signaling;
herein, the first signaling and the second signaling respectively comprise scheduling information of the first radio signal and scheduling information of the second radio signal; the operating is transmitting, and the first node is a base station; or the operating is receiving, and the first node is a UE.

According to one aspect of the present disclosure, comprising:
receiving first information;
herein, the first node is a UE, the first information is used to determine a first sub-band combination, the first sub-band combination comprises a positive integer number of sub-bands, and the first sub-band and the second sub-band both belong to the first sub-band combination.

According to one aspect of the present disclosure, wherein at least one transmission antenna port of the first radio signal is QCL with an antenna port in the first antenna port group, at least one transmission antenna port of the second radio signal is QCL with an antenna port in a second antenna port group, and each of the P energy detection(s) is associated with the second antenna port group.

In one embodiment, the above method is advantageous in that interferences with ongoing wireless communications in other directions than a direction of LBT can be avoided.

The present disclosure provides a method in a second node for wireless communication, comprising:
receiving a first radio signal at a first instant of time on a first sub-band; and
monitoring a second radio signal at the first instant of time on a second sub-band;
herein, Q detection value(s) is(are) used to determine that the first radio signal is transmitted at the first instant of time on the first sub-band, the Q detection value(s) is(are) respectively obtained through Q energy detection(s), and the Q energy detection(s) is(are) respectively performed in Q time sub-pool(s) on the first sub-band; P detection value(s) is(are) used to determine whether the second radio signal is transmitted at the first instant of time on the second sub-band, the P detection value(s) is(are) respectively obtained through P energy detection(s), and the P energy detection(s) is(are) respectively performed in P time sub-pool(s) on the second sub-band; each of the Q energy detection(s) is associated with a first antenna port group; when each of the P energy detection(s) is associated with the first antenna port group, P is P1; when one of the P energy detection(s) is not associated with the first antenna port group, the P is P2; the P1 and the P2 are unequal positive integers; Q is a positive integer; an antenna port group comprises a positive integer number of antenna port(s); the second node is a UE, or the second node is a base station.

According to one aspect of the present disclosure, wherein each of Q3 detection value(s) among the Q detection value(s) is lower than a first threshold, wherein Q3 is a candidate integer of K1 candidate integer(s), and K1 is a positive integer.

According to one aspect of the present disclosure, wherein the P is the P1, and the P1 is a fixed value, when each of the P detection value(s) is lower than a second threshold, the second radio signal is transmitted at the first instant of time on the second sub-band, otherwise the second radio signal is not transmitted at the first instant of time on the second sub-band.

According to one aspect of the present disclosure, wherein the P is the P2, and the P2 is greater than P3, wherein the P3 is a candidate integer of K2 candidate integer(s), when each of P3 detection value(s) among the P detection value(s) is lower than a third threshold, the second radio signal is transmitted at the first instant of time on the second sub-band, otherwise the second radio signal is not transmitted at the first instant of time on the second sub-band; the K2 being a positive integer.

According to one aspect of the present disclosure, comprising:
processing at least one of a first signaling or a second signaling;
herein, the first signaling and the second signaling respectively comprise scheduling information of the first radio signal and scheduling information of the second radio signal, the processing is receiving and the second node is a UE; or the processing is transmitting and the second node is a base station.

According to one aspect of the present disclosure, comprising:
transmitting first information;
herein, the second node is a base station; the first information is used to determine a first sub-band combination, the first sub-band combination comprises a positive integer number of sub-bands, and the first sub-band and the second sub-band both belong to the first sub-band combination.

According to one aspect of the present disclosure, wherein at least one transmission antenna port of the first radio signal is QCL with an antenna port in the first antenna port group; at least one transmission antenna port of the second radio signal is QCL with an antenna port in a second antenna port group, and each of the P energy detection(s) is associated with the second antenna port group.

The present disclosure provides a device in a first node for wireless communications, comprising:
a first processor, performing Q energy detection(s) respectively in Q time sub-pool(s) on a first sub-band to obtain Q detection value(s); and determining only based on the Q detection value(s) that a first radio signal is transmitted at a first instant of time on the first sub-band;
a first receiver, performing P energy detection(s) respectively in P time sub-pool(s) on a second sub-band to obtain P detection value(s);
a first transmitter, transmitting a second radio signal at the first instant of time on the second sub-band, or, dropping transmitting the second radio signal at the first instant of time on the second sub-band;
herein, Q is a positive integer; the P detection value(s) is(are) used to determine whether the second radio signal is transmitted at the first instant of time on the second sub-band; and each of the Q energy detection(s) is associated with a first antenna port group; when each of the P energy detection(s) is associated with the first antenna port group, P is P1; when one of the P energy detection(s) is not associated with the first antenna port group, the P is P2; the P1 and the P2 are unequal positive integers; an antenna port group comprises a positive integer number of antenna port(s); the first node is a base station, or the first node is a UE.

In one embodiment, the above device in the first node for wireless communications is characterized in that the P is the P1, and the P1 is a fixed value; when each of the P detection value(s) is lower than a second threshold, the first transmitter transmits the second radio signal at the first instant of time on the second sub-band, otherwise the first transmitter drops transmitting the second radio signal at the first instant of time on the second sub-band.

In one embodiment, the above device in the first node for wireless communications is characterized in that the P is the P2, and the P2 is greater than P3, wherein the P3 is a candidate integer of K2 candidate integer(s); when each of P3 detection value(s) among the P detection value(s) is lower than a third threshold, the first transmitter transmits the second radio signal at the first instant of time on the second sub-band, otherwise the first transmitter drops transmitting the second radio signal at the first instant of time on the second sub-band; the K2 being a positive integer.

In one embodiment, the above device in the first node for wireless communications is characterized in that at least one transmission antenna port of the first radio signal is QCL with an antenna port in the first antenna port group; at least one transmission antenna port of the second radio signal is QCL with an antenna port in a second antenna port group, and each of the P energy detection(s) is associated with the second antenna port group.

In one embodiment, the above device in the first node for wireless communications is characterized in comprising:
a second transmitter, transmitting the first radio signal at the first instant of time on the first sub-band;
herein, the Q detection value(s) is(are) used to determine that the first radio signal is transmitted at the first instant of time on the first sub-band, and each of Q3 detection value(s) among the Q detection value(s) is lower than a first threshold, wherein Q3 is a candidate integer of K1 candidate integer(s), and K1 is a positive integer.

In one embodiment, the above device in the first node for wireless communications is characterized in comprising:
a second processor, operating at least one of a first signaling or a second signaling;
herein, the first signaling and the second signaling respectively comprise scheduling information of the first radio signal and scheduling information of the second radio signal; the operating is transmitting, and the first node is a base station; or the operating is receiving, and the first node is a UE.

In one embodiment, the above device in the first node for wireless communications is characterized in that the second processor also receives first information; herein, the first node is a UE; the first information is used to determine a first sub-band combination, the first sub-band combination comprises a positive integer number of sub-bands, and the first sub-band and the second sub-band both belong to the first sub-band combination.

The present disclosure provides a device in a second node for wireless communications, comprising:
a second receiver, receiving a first radio signal at a first instant of time on a first sub-band;
a third receiver, monitoring a second radio signal at the first instant of time on a second sub-band;
herein, Q detection value(s) is(are) used to determine that the first radio signal is transmitted at the first instant of time on the first sub-band, the Q detection value(s) is(are) respectively obtained through Q energy detection(s), and the Q energy detection(s) is(are) respectively performed in Q time sub-pool(s) on the first sub-band; P detection value(s) is(are) used to determine whether the second radio signal is transmitted at the first instant of time on the second sub-band, the P detection value(s) is(are) respectively obtained through P energy detection(s), and the P energy detection(s) is(are) respectively performed in P time sub-pool(s) on the second sub-band; each of the Q energy detection(s) is associated with a first antenna port group; when each of the P energy detection(s) is associated with the first antenna port group, P is P1; when one of the P energy detection(s) is not associated with the first antenna port group, the P is P2; the P1 and the P2 are unequal positive integers; Q is a positive integer; an antenna port group comprises a positive integer number of antenna port(s); the second node is a UE, or the second node is a base station.

In one embodiment, the above device in the second node for wireless communication is characterized in that each of Q3 detection value(s) among the Q detection value(s) is lower than a first threshold, wherein Q3 is a candidate integer of K1 candidate integer(s), and K1 is a positive integer.

In one embodiment, the above device in the second node for wireless communication is characterized in that the P is the P1, and the P1 is a fixed value; when each of the P detection value(s) is lower than a second threshold, the second radio signal is transmitted at the first instant of time on the second sub-band, otherwise the second radio signal is not transmitted at the first instant of time on the second sub-band.

In one embodiment, the above device in the second node for wireless communication is characterized in that the P is the P2, and the P2 is greater than P3, wherein the P3 is a candidate integer of K2 candidate integer(s); when each of P3 detection value(s) among the P detection value(s) is lower than a third threshold, the second radio signal is transmitted at the first instant of time on the second sub-band, otherwise the second radio signal is not transmitted at the first instant of time on the second sub-band; the K2 being a positive integer.

In one embodiment, the above device in the second node for wireless communication is characterized in that at least one transmission antenna port of the first radio signal is QCL with an antenna port in the first antenna port group; at least one transmission antenna port of the second radio signal is QCL with an antenna port in a second antenna port group, and each of the P energy detection(s) is associated with the second antenna port group.

In one embodiment, the above device in the second node for wireless communication is characterized in comprising:
 a third processor, processing at least one of a first signaling or a second signaling;
 herein, the first signaling and the second signaling respectively comprise scheduling information of the first radio signal and scheduling information of the second radio signal; the processing is receiving and the second node is a UE, or the processing is transmitting and the second node is a base station.

In one embodiment, the above device in the second node for wireless communication is characterized in that the third processor transmits first information; herein, the second node is a base station; the first information is used to determine a first sub-band combination, the first sub-band combination comprises a positive integer number of sub-bands, and the first sub-band and the second sub-band both belong to the first sub-band combination.

In one embodiment, the present disclosure has the following edges over conventional schemes:

In multicarrier-supporting Unlicensed Spectrum communications, the correlation between beams respectively employed on two carriers is taken into account when determining whether the result of LBT on one carrier can reflect the channel occupancy on the other carrier. Since LBT based on a specific beam only can reflect the channel occupancy in the direction of the beam, possible interference with ongoing wireless transmissions in other directions on Unlicensed Spectrum can be avoided, thus ensuring fairness in the contention for occupancy of the Unlicensed Spectrum from all directions.

If beams used on two carriers are relevant, when a carrier is determined as idle by Cat 4 LBT, when a carrier is determined as idle by Cat 4 LBT, it is only necessary to perform on the other carrier a brief Cat 2 LBT that includes no backoff, thus enhancing the chance of access to the other carrier as well as the access rate.

If beams used on two carriers are irrelevant, then backoff-including Cat 4 LBT is required to be performed on both carriers so as to ensure fairness in the contention for occupancy of Unlicensed Spectrum with other kinds of equipment.

BRIEF DESCRIPTION OF THE DRAWINGS

Other features, objects and advantages of the present disclosure will become more apparent from the detailed description of non-restrictive embodiments taken in conjunction with the following drawings.

EMBODIMENT 1

Figure 1:
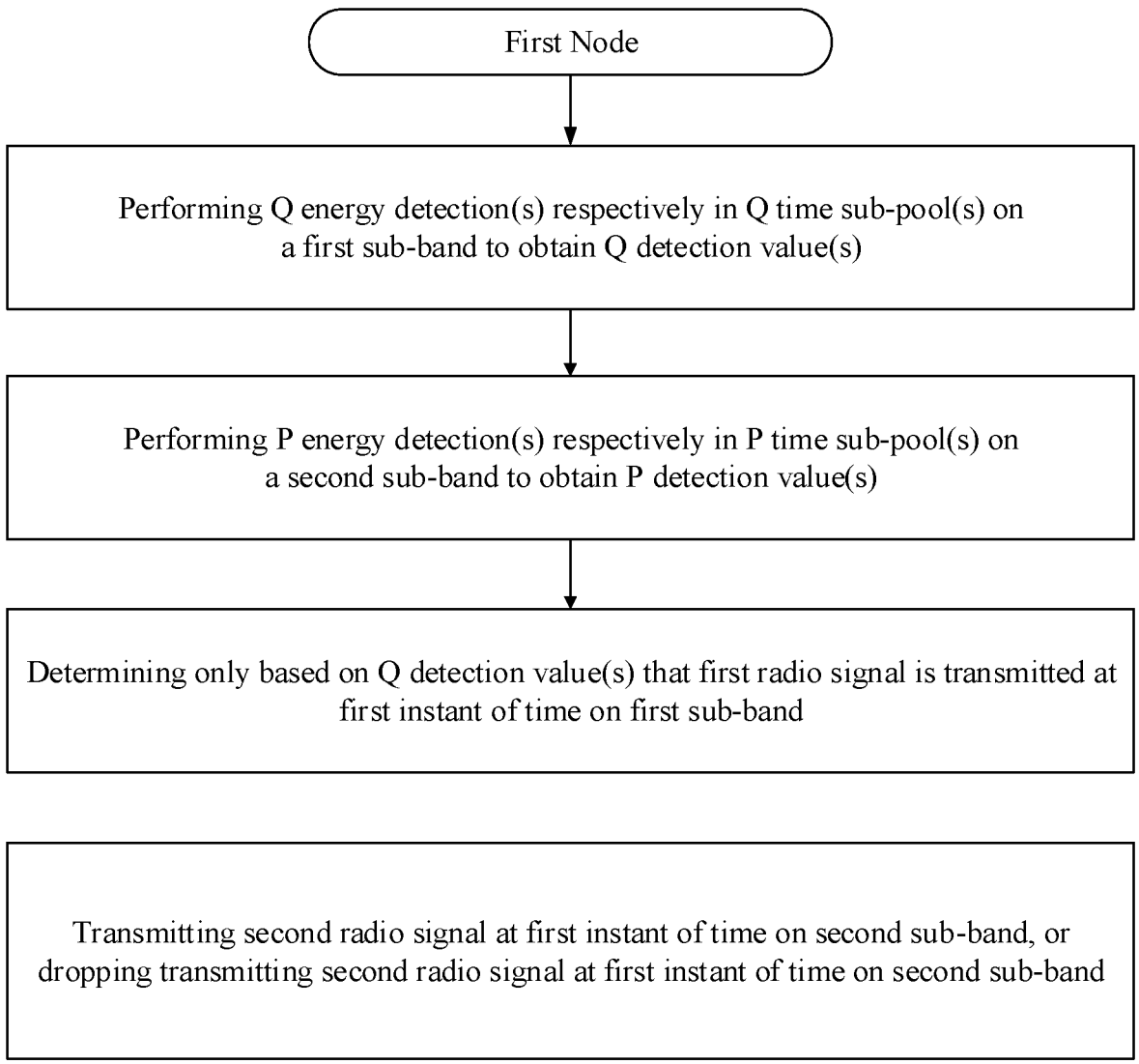
FIG. 1 illustrates a flowchart of Q energy detection(s), P energy detection(s) and a second radio signal according to one embodiment of the present disclosure.

Embodiment 1 illustrates a flowchart of Q energy detection(s), P energy detection(s) and a second radio signal; as shown in FIG. 1.

In Embodiment 1, the first node of the present disclosure performs Q energy detection(s) respectively in Q time sub-pool(s) on a first sub-band to obtain Q detection value(s); performs P energy detection(s) respectively in P time sub-pool(s) on a second sub-band to obtain P detection value(s); determines only based on the Q detection value(s) that a first radio signal is transmitted at a first instant of time on the first sub-band; transmits a second radio signal at the first instant of time on the second sub-band, or, drops transmitting the second radio signal at the first instant of time on the second sub-band. Herein, Q is a positive integer; the P detection value(s) is(are) used to determine whether the second radio signal is transmitted at the first instant of time on the second sub-band; and each of the Q energy detection(s) is associated with a first antenna port group; when each of the P energy detection(s) is associated with the first antenna port group, P is P1; when one of the P energy detection(s) is not associated with the first antenna port group, the P is P2; the P1 and the P2 are unequal positive integers; an antenna port group comprises a positive integer number of antenna port(s); the first node is a base station, or the first node is a UE.

In one embodiment, the P1 is less than the P2.

In one embodiment, the first instant of time is an end time of the Q time sub-pool(s).

In one embodiment, the first instant of time is an end time of the P time sub-pool(s).

In one embodiment, the Q time sub-pool(s) and the P time sub-pool(s) end at the same instant of time.

In one embodiment, the first instant of time is later than an end time of the Q time sub-pool(s) in time domain.

In one embodiment, the first instant of time is later than an end time of the P time sub-pool(s) in time domain.

In one embodiment, the first sub-band is deployed at Unlicensed Spectrum.

In one embodiment, the first sub-band comprises a carrier.

In one embodiment, the first sub-band comprises multiple carriers.

In one embodiment, the first sub-band comprises a Bandwidth Part (BWP) in a carrier.

In one embodiment, the first sub-band comprises multiple BWPs in a carrier.

In one embodiment, the first sub-band comprises a positive integer number of Physical Resource Block(s) (PRB) in frequency domain.

In one embodiment, the first sub-band comprises a positive integer number of contiguous PRBs.

In one embodiment, the first sub-band comprises a positive integer number of Resource Block(s) (RB) in frequency domain.

In one embodiment, the first sub-band comprises a positive integer number of contiguous RBs.

In one embodiment, the first sub-band comprises a positive integer number of contiguous subcarriers.

In one embodiment, the second sub-band is deployed at Unlicensed Spectrum.

In one embodiment, the second sub-band comprises a carrier.

In one embodiment, the second sub-band comprises multiple carriers.

In one embodiment, the second sub-band comprises a BWP in a carrier.

In one embodiment, the second sub-band comprises multiple BWPs in a carrier.

In one embodiment, the second sub-band comprises a positive integer number of PRB(s) in frequency domain.

In one embodiment, the second sub-band comprises a positive integer number of contiguous PRBs.

In one embodiment, the second sub-band comprises a positive integer number of RB(s) in frequency domain.

In one embodiment, the second sub-band comprises a positive integer number of contiguous RBs.

In one embodiment, the second sub-band comprises a positive integer number of contiguous subcarriers.

In one embodiment, each of the P energy detection(s) is associated with the first antenna port group, or none of the P energy detection(s) is associated with the first antenna port group.

In one embodiment, the Q energy detection(s) is(are) used to determine whether the first sub-band is idle.

In one embodiment, the Q energy detection(s) is(are) used to determine whether the first sub-band can be used by the first node for transmitting a radio signal.

In one embodiment, the Q energy detection(s) is(are) used to determine that the first sub-band is idle.

In one embodiment, the Q energy detection(s) is(are) used to determine that the first sub-band can be used by the first node for transmitting a radio signal.

In one embodiment, the Q energy detection(s) is(are) energy detection(s) in LBT, and the specific definition and way of implementation of the LBT can be found in 3GPP TR36.889.

In one embodiment, the Q energy detection(s) is(are) energy detection(s) in Clear Channel Assessment (CCA), and the specific definition and way of implementation of the CCA can be found in 3GPP TR36.889.

In one embodiment, any of the Q energy detection(s) is implemented in a way defined in 3GPP TS36.213, section 15.

In one embodiment, the Q energy detection(s) means (mean) that the first node monitors (a) received power(s) in Q time unit(s) on the first sub-band, and the Q time unit(s) is(are) Q consecutive time duration(s) respectively in the Q time sub-pool(s).

In one embodiment, the Q energy detection(s) means (mean) that the first node monitors (a) received energy (energies) in Q time unit(s) on the first sub-band, and the Q time unit(s) is(are) Q consecutive time duration(s) respectively in the Q time sub-pool(s).

In one embodiment, the Q energy detection(s) means (mean) that the first node senses power of all radio signals in Q time unit(s) on the first sub-band and averages in time; the Q time unit(s) is(are) Q consecutive time duration(s) respectively in the Q time sub-pool(s).

In one embodiment, the Q energy detection(s) means (mean) that the first node senses energy of all radio signals in Q time unit(s) on the first sub-band and averages in time; the Q time unit(s) is(are) Q consecutive time duration(s) respectively in the Q time sub-pool(s).

In one embodiment, any of the Q time unit(s) lasts no shorter than 4 µs.

In one embodiment, the P energy detection(s) is(are) used to determine whether the second sub-band is idle.

In one embodiment, the P energy detection(s) is(are) used to determine whether the second sub-band can be used by the first node for transmitting a radio signal.

In one embodiment, the P energy detection(s) is(are) energy detection(s) in LBT, and the specific definition and way of implementation of the LBT can be found in 3GPP TR36.889.

In one embodiment, the P energy detection(s) is(are) energy detection(s) in Clear Channel Assessment (CCA), and the specific definition and way of implementation of the CCA can be found in 3GPP TR36.889.

In one embodiment, any of the P energy detection(s) is implemented in a way defined in 3GPP TS36.213, section 15.

In one embodiment, the P energy detection(s) means (mean) that the first node monitors (a) received power(s) in P time unit(s) on the second sub-band, and the P time unit(s) is(are) P consecutive time duration(s) respectively in the P time sub-pool(s).

In one embodiment, the P energy detection(s) means (mean) that the first node monitors (a) received energy (energies) in P time unit(s) on the second sub-band, and the P time unit(s) is(are) P consecutive time duration(s) respectively in the P time sub-pool(s).

In one embodiment, the P energy detection(s) means (mean) that the first node senses power of all radio signals in P time unit(s) on the second sub-band and averages in time; the P time unit(s) is(are) P consecutive time duration(s) respectively in the P time sub-pool(s).

In one embodiment, the P energy detection(s) means (mean) that the first node senses energy of all radio signals in P time unit(s) on the second sub-band and averages in time; the P time unit(s) is(are) P consecutive time duration(s) respectively in the P time sub-pool(s).

In one embodiment, any of the P time unit(s) lasts no shorter than 4 µs.

In one embodiment, time-domain resources occupied by any of the Q time sub-pool(s) are contiguous.

In one embodiment, the Q time sub-pools are mutually orthogonal (that is, non-overlapped) in time domain.

In one embodiment, time-domain resources occupied by any of the P time sub-pool(s) are contiguous.

In one embodiment, the P time sub-pools are mutually orthogonal (that is, non-overlapped) in time domain.

In one embodiment, the Q detection value(s) is(are) respectively obtained through the Q energy detection(s).

In one embodiment, the P detection value(s) is(are) respectively obtained through the P energy detection(s).

In one embodiment, the Q energy detections each employ the same Spatial Rx parameters.

In one embodiment, the Q energy detections each employ a same receiving beam.

In one embodiment, the Q energy detections each employ the same receiving spatial filtering.

In one embodiment, the phrase that each of the Q energy detection(s) is associated with a first antenna port group means that the first antenna port group is used to determine Spatial Rx parameters used for each energy detection of the Q energy detection(s).

In one embodiment, the phrase that each of the Q energy detection(s) is associated with a first antenna port group means that Spatial Tx parameters corresponding to antenna ports in the first antenna port group are used to determine Spatial Rx parameters used for each energy detection of the Q energy detection(s).

In one embodiment, the phrase that each of the Q energy detection(s) is associated with a first antenna port group means that transmitting spatial filtering corresponding to antenna ports in the first antenna port group is used to determine receiving spatial filtering used for each energy detection of the Q energy detection(s).

In one embodiment, the phrase that each of the Q energy detection(s) is associated with a first antenna port group means that a spatial coverage of a receiving beam corresponding to each of the Q energy detection(s) is located within a set of spatial coverages of transmitting beams corresponding to all antenna ports in the first antenna port group.

In one embodiment, the phrase that each of the Q energy detection(s) is associated with a first antenna port group means that a spatial coverage of a transmitting beam corresponding to any antenna port in the first antenna port group is located within a spatial coverage of a receiving beam corresponding to any of the Q energy detection(s).

In one embodiment, the phrase that each of the Q energy detection(s) is associated with a first antenna port group means that a set of spatial coverages of transmitting beams corresponding to all antenna ports in the first antenna port group overlaps with a spatial coverage of a receiving beam corresponding to each of the Q energy detection(s).

In one embodiment, the P energy detections each employ the same Spatial Rx parameters.

In one embodiment, the P energy detections each employ a same receiving beam.

In one embodiment, the P energy detections each employ the same spatial filtering.

In one embodiment, the phrase that each of the P energy detection(s) is associated with the first antenna port group means that the first antenna port group is used to determine Spatial Rx parameters used for each energy detection of the P energy detection(s).

In one embodiment, the phrase that each of the P energy detection(s) is associated with the first antenna port group means that Spatial Tx parameters corresponding to antenna ports in the first antenna port group are used to determine Spatial Rx parameters used for each energy detection of the P energy detection(s).

In one embodiment, the phrase that each of the P energy detection(s) is associated with the first antenna port group means that transmitting spatial filtering corresponding to antenna ports in the first antenna port group is used to determine receiving spatial filtering used for each energy detection of the P energy detection(s).

In one embodiment, the phrase that each of the P energy detection(s) is associated with the first antenna port group means that a spatial coverage of a receiving beam corresponding to each of the P energy detection(s) is located within a set of spatial coverages of transmitting beams corresponding to all antenna ports in the first antenna port group.

In one embodiment, the phrase that each of the P energy detection(s) is associated with the first antenna port group means that a spatial coverage of a transmitting beam corresponding to any antenna port in the first antenna port group is located within a spatial coverage of a receiving beam corresponding to each of the P energy detection(s).

In one embodiment, the phrase that each of the P energy detection(s) is associated with a first antenna port group means that a set of spatial coverages of transmitting beams corresponding to all antenna ports in the first antenna port group overlaps with a spatial coverage of a receiving beam corresponding to each of the P energy detection(s).

In one embodiment, Spatial Rx parameters comprise one or more of a receiving beam, a reception analog beamforming matrix, a reception analog beamforming vector, a reception beamforming vector and a receiving spatial filtering.

In one embodiment, Spatial Tx parameters comprise one or more of a transmission antenna port, a transmission antenna port group, a transmitting beam, a transmission analog beamforming matrix, a transmission analog beamforming vector, a transmission beamforming vector and a transmitting spatial filtering.

EMBODIMENT 2

Figure 2:
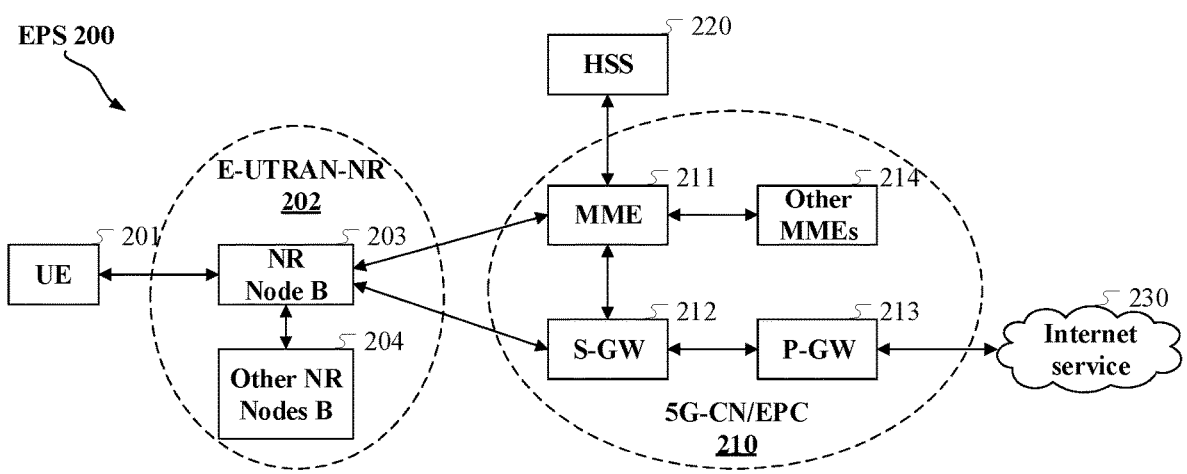
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), Long-Term Evolution Advanced (LTE-A) and future 5G systems. The LTE network architecture 200 may be called an Evolved Packet System (EPS) 200, which may comprise one or more UEs 201, an Evolved UMTS Terrestrial Radio Access Network New Radio (E-UTRAN-NR) 202, a 5G-Core Network/ Evolved Packet Core (5G-CN/EPC) 210, a Home Subscriber Server (HSS) 220 and an Internet Service 230, herein the UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an NR node B (gNB) 203 and other gNBs 204. The gNB 203 provides UE 201-oriented user plane and control plane terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPS), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 comprises a Mobility Management Entity (MME) 211, other MMEs 214, a Service Gateway (S-GW) 212 and a Packet Date Network Gateway (P-GW) 213. The MME 211 is a control node for processing a signaling between the UE 201 and the 5G-CN/ EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the gNB 203 corresponds to the first node in the present disclosure, and the UE 201 corresponds to the second node in the present disclosure.

In one embodiment, the UE 201 corresponds to the first node in the present disclosure, and the gNB 203 corresponds to the second node in the present disclosure.

In one embodiment, the UE 201 supports wireless communications with data transmitted on Unlicensed Spectrum.

In one embodiment, the gNB 203 supports wireless communications with data transmitted on Unlicensed Spectrum.

In one embodiment, the UE 201 supports Carrier Aggregation.

In one embodiment, the gNB 203 supports Carrier Aggregation.

EMBODIMENT 3

Figure 3:
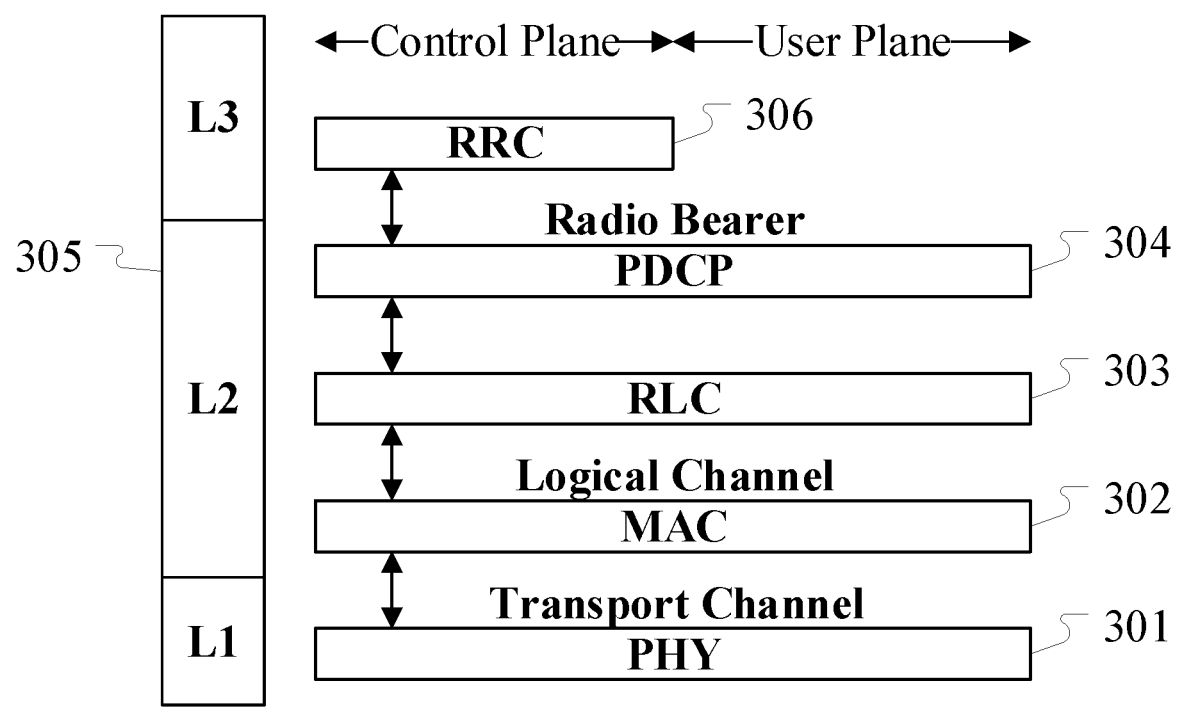
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the Q detection value(s) in the present disclosure is(are) generated by the PHY 301.

In one embodiment, the P detection value(s) in the present disclosure is(are) generated by the PHY 301.

In one embodiment, the first radio signal in the present disclosure is generated by the PHY 301.

In one embodiment, the second radio signal in the present disclosure is generated by the PHY 301.

In one embodiment, the first signaling in the present disclosure is generated by the PHY 301.

In one embodiment, the first signaling in the present disclosure is generated by the MAC sublayer 302.

In one embodiment, the first signaling in the present disclosure is generated by the RRC sublayer 306.

In one embodiment, the second signaling in the present disclosure is generated by the PHY 301.

In one embodiment, the second signaling in the present disclosure is generated by the MAC sublayer 302.

In one embodiment, the second signaling in the present disclosure is generated by the RRC sublayer 306.

In one embodiment, the first information in the present disclosure is generated by the MAC sublayer 302.

In one embodiment, the first information in the present disclosure is generated by the RRC sublayer 306.

EMBODIMENT 4

Figure 4:
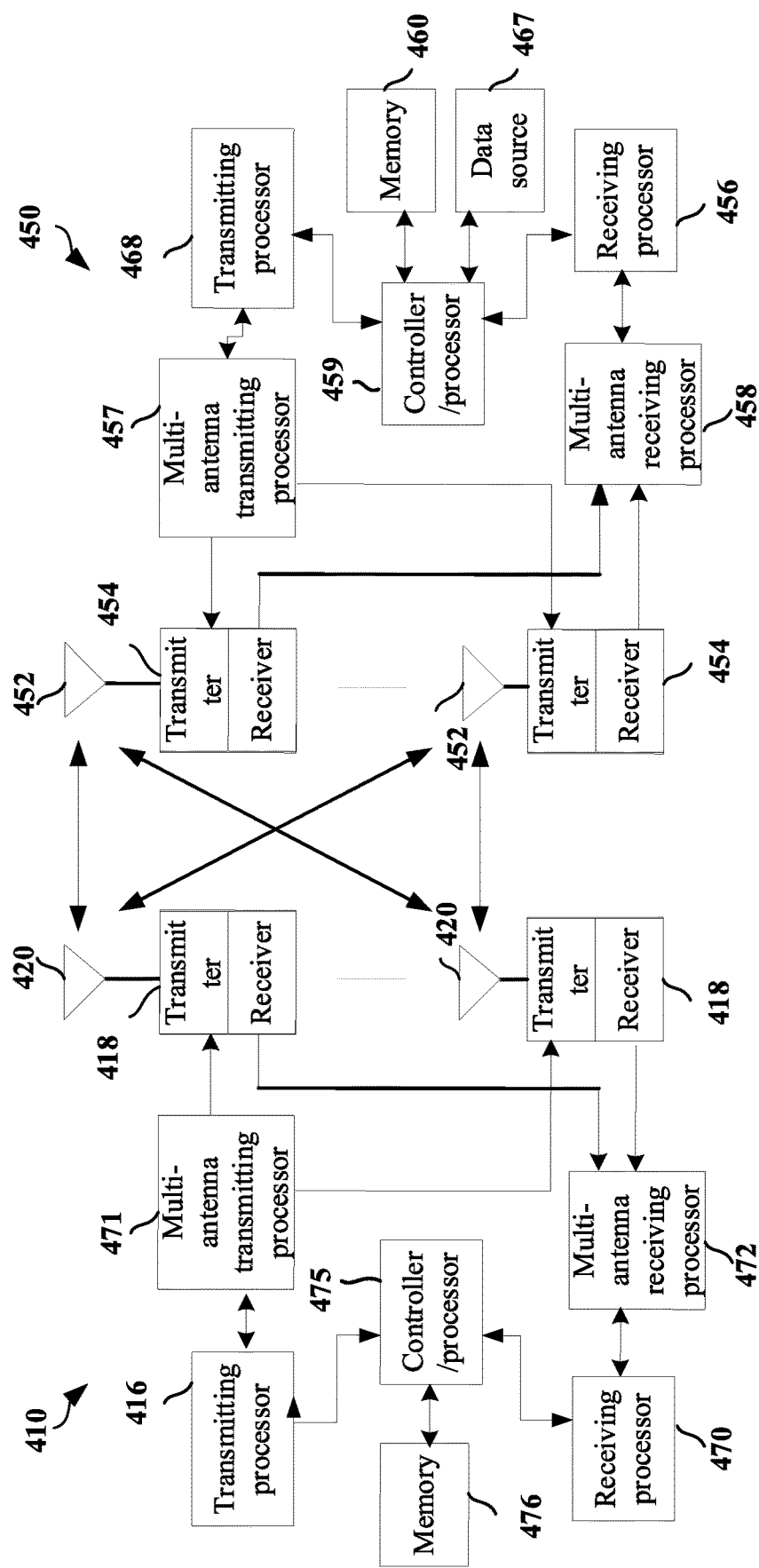
FIG. 4 illustrates a schematic diagram of an NR node and a UE according to one embodiment of the present disclosure.

Embodiment 4 illustrates a schematic diagram of a New Radio (NR) node and a UE, as shown in FIG. 4. FIG. 4 is a block diagram of a UE 450 and a gNB 410 in communication with each other in an access network.

The gNB 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In downlink (DL) transmission, at the gNB 410, a higher-layer packet from a core network is provided to the controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE 450. The transmitting processor 416 and the multi-antenna transmitting processor 471 perform signal processing functions used for the L1 layer (that is, PHY). The transmitting processor 416 performs coding and interleaving so as to ensure a Forward Error Correction (FEC) at the UE 450 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based and non-codebook-based precoding, as well as beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided from the receiver 454. The receiving processor 456 converts the baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any UE 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In DL, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is configured to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The transmitting processor 468 performs modulation, mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be associated with the memory 476 that stores program code and data. The memory 476 can be called a computer readable medium. In UL transmission, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory. The at least one memory includes computer program codes. The at least one memory and the computer program codes are configured to be used in collaboration with the at least one processor. The UE 450 at least performs Q energy detection(s) respectively in Q time sub-pool(s) on the first sub-band of the present disclosure to obtain Q detection value(s); and determines only based on the Q detection value(s) that a first radio signal is transmitted at a first instant of time on the first sub-band; performs P energy detection(s) respectively in P time sub-pool(s) on a second sub-band of the present disclosure to obtain P detection value(s); and transmits a second radio signal at the first instant of time on the second sub-band, or, drops transmitting the second radio signal at the first instant of time on the second sub-band. Herein, the P detection value(s) is(are) used to determine whether the second radio signal is transmitted at the first instant of time on the second sub-band; and each of the Q energy detection(s) is associated with a first antenna port group; when each of the P energy detection(s) is associated with the first antenna port group, P is P1; when one of the P energy detection(s) is not associated with the first antenna port group, the P is P2; the P1 and the P2 are unequal positive integers. The first node of the present disclosure is a UE.

In one embodiment, the UE 450 comprises a memory that stores a computer readable instruction program. The computer readable instruction program generates actions when executed by at least one processor, which include: performing Q energy detection(s) respectively in Q time sub-pool(s) on the first sub-band of the present disclosure to obtain Q detection value(s); and determining only based on the Q detection value(s) that a first radio signal is transmitted at a first instant of time on the first sub-band; performing P energy detection(s) respectively in P time sub-pool(s) on a second sub-band of the present disclosure to obtain P detection value(s); and transmitting a second radio signal at the first instant of time on the second sub-band, or, dropping transmitting the second radio signal at the first instant of time on the second sub-band. Herein, the P detection value(s) is(are) used to determine whether the second radio signal is transmitted at the first instant of time on the second sub-band; and each of the Q energy detection(s) is associated with a first antenna port group; when each of the P energy detection(s) is associated with the first antenna port group, P is P1; when one of the P energy detection(s) is not associated with the first antenna port group, the P is P2; the P1 and the P2 are unequal positive integers. The first node of the present disclosure is a UE.

In one embodiment, the UE 450 comprises at least one processor and at least one memory. The at least one memory includes computer program codes. The at least one memory and the computer program codes are configured to be used in collaboration with the at least one processor. The UE 450 at least receives a first radio signal at a first instant of time on the first sub-band of the present disclosure; and monitors a second radio signal at the first instant of time on a second sub-band; herein, Q detection value(s) is(are) used to determine that the first radio signal is transmitted at the first instant of time on the first sub-band, the Q detection value(s) is(are) respectively obtained through Q energy detection(s), and the Q energy detection(s) is(are) respectively performed in Q time sub-pool(s) on the first sub-band; P detection value(s) is(are) used to determine whether the second radio signal is transmitted at the first instant of time on the second sub-band, the P detection value(s) is(are) respectively obtained through P energy detection(s), and the P energy detection(s) is(are) respectively performed in P time sub-pool(s) on the second sub-band; each of the Q energy detection(s) is associated with a first antenna port group; when each of the P energy detection(s) is associated with the first antenna port group, P is P1; when one of the P energy detection(s) is not associated with the first antenna port group, the P is P2; the P1 and the P2 are unequal positive integers. The second node of the present disclosure is a UE.

In one embodiment, the UE 450 comprises a memory that stores a computer readable instruction program. The computer readable instruction program generates actions when executed by at least one processor, which include: receiving a first radio signal at a first instant of time on the first sub-band of the present disclosure; and monitoring a second radio signal at the first instant of time on a second sub-band; herein, Q detection value(s) is(are) used to determine that the first radio signal is transmitted at the first instant of time on the first sub-band, the Q detection value(s) is(are) respectively obtained through Q energy detection(s), and the Q energy detection(s) is(are) respectively performed in Q time sub-pool(s) on the first sub-band; P detection value(s) is(are) used to determine whether the second radio signal is transmitted at the first instant of time on the second sub-band, the P detection value(s) is(are) respectively obtained through P energy detection(s), and the P energy detection(s) is(are)

respectively performed in P time sub-pool(s) on the second sub-band; each of the Q energy detection(s) is associated with a first antenna port group; when each of the P energy detection(s) is associated with the first antenna port group, P is P1; when one of the P energy detection(s) is not associated with the first antenna port group, the P is P2; the P1 and the P2 are unequal positive integers. The second node of the present disclosure is a UE.

In one embodiment, the gNB 410 comprises at least one processor and at least one memory. The at least one memory includes computer program codes. The at least one memory and the computer program codes are configured to be used in collaboration with the at least one processor. The gNB 410 at least performs Q energy detection(s) respectively in Q time sub-pool(s) on the first sub-band of the present disclosure to obtain Q detection value(s); and determines only based on the Q detection value(s) that a first radio signal is transmitted at a first instant of time on the first sub-band; performs P energy detection(s) respectively in P time sub-pool(s) on a second sub-band of the present disclosure to obtain P detection value(s); and transmits a second radio signal at the first instant of time on the second sub-band, or, drops transmitting the second radio signal at the first instant of time on the second sub-band. Herein, the P detection value(s) is(are) used to determine whether the second radio signal is transmitted at the first instant of time on the second sub-band; and each of the Q energy detection(s) is associated with a first antenna port group; when each of the P energy detection(s) is associated with the first antenna port group, P is P1; when one of the P energy detection(s) is not associated with the first antenna port group, the P is P2; the P1 and the P2 are unequal positive integers. The first node of the present disclosure is a base station.

In one embodiment, the gNB 410 comprises a memory that stores a computer readable instruction program. The computer readable instruction program generates actions when executed by at least one processor, which include: performing Q energy detection(s) respectively in Q time sub-pool(s) on the first sub-band of the present disclosure to obtain Q detection value(s); and determining only based on the Q detection value(s) that a first radio signal is transmitted at a first instant of time on the first sub-band; performing P energy detection(s) respectively in P time sub-pool(s) on a second sub-band of the present disclosure to obtain P detection value(s); and transmitting a second radio signal at the first instant of time on the second sub-band, or, dropping transmitting the second radio signal at the first instant of time on the second sub-band. Herein, the P detection value(s) is(are) used to determine whether the second radio signal is transmitted at the first instant of time on the second sub-band; and each of the Q energy detection(s) is associated with a first antenna port group; when each of the P energy detection(s) is associated with the first antenna port group, P is P1; when one of the P energy detection(s) is not associated with the first antenna port group, the P is P2; the P1 and the P2 are unequal positive integers. The first node of the present disclosure is a base station.

In one embodiment, the gNB 410 comprises at least one processor and at least one memory. The at least one memory includes computer program codes. The at least one memory and the computer program codes are configured to be used in collaboration with the at least one processor. The gNB 410 at least receives a first radio signal at a first instant of time on the first sub-band of the present disclosure; and monitors a second radio signal at the first instant of time on a second sub-band; herein, Q detection value(s) is(are) used to determine that the first radio signal is transmitted at the first instant of time on the first sub-band, the Q detection value(s) is(are) respectively obtained through Q energy detection(s), and the Q energy detection(s) is(are) respectively performed in Q time sub-pool(s) on the first sub-band; P detection value(s) is(are) used to determine whether the second radio signal is transmitted at the first instant of time on the second sub-band, the P detection value(s) is(are) respectively obtained through P energy detection(s), and the P energy detection(s) is(are) respectively performed in P time sub-pool(s) on the second sub-band; each of the Q energy detection(s) is associated with a first antenna port group; when each of the P energy detection(s) is associated with the first antenna port group, P is P1; when one of the P energy detection(s) is not associated with the first antenna port group, the P is P2; the P1 and the P2 are unequal positive integers. The second node of the present disclosure is a base station.

In one embodiment, the gNB 410 comprises a memory that stores a computer readable instruction program. The computer readable instruction program generates actions when executed by at least one processor, which include: receiving a first radio signal at a first instant of time on the first sub-band of the present disclosure; and monitoring a second radio signal at the first instant of time on a second sub-band; herein, Q detection value(s) is(are) used to determine that the first radio signal is transmitted at the first instant of time on the first sub-band, the Q detection value(s) is(are) respectively obtained through Q energy detection(s), and the Q energy detection(s) is(are) respectively performed in Q time sub-pool(s) on the first sub-band; P detection value(s) is(are) used to determine whether the second radio signal is transmitted at the first instant of time on the second sub-band, the P detection value(s) is(are) respectively obtained through P energy detection(s), and the P energy detection(s) is(are) respectively performed in P time sub-pool(s) on the second sub-band; each of the Q energy detection(s) is associated with a first antenna port group; when each of the P energy detection(s) is associated with the first antenna port group, P is P1; when one of the P energy detection(s) is not associated with the first antenna port group, the P is P2; the P1 and the P2 are unequal positive integers. The second node of the present disclosure is a base station.

In one embodiment, the gNB 410 corresponds to the first node in the present disclosure, and the UE 450 corresponds to the second node in the present disclosure.

In one embodiment, the UE 450 corresponds to the first node in the present disclosure, and the gNB 410 corresponds to the second node in the present disclosure.

In one embodiment, at least one of the antenna 452, the receiver 454, the receiving processor 456, the multi-antenna receiving processor 458 or the controller/processor 459 is used to perform the Q energy detection(s) respectively in the Q time sub-pool(s) on the first sub-band of the present disclosure; the first node of the present disclosure is a UE.

In one embodiment, at least one of the antenna 420, the receiver 418, the receiving processor 470, the multi-antenna receiving processor 472 or the controller/processor 475 is used to perform the Q energy detection(s) respectively in the Q time sub-pool(s) on the first sub-band of the present disclosure; the first node of the present disclosure is a base station.

In one embodiment, at least one of the antenna 452, the receiver 454, the receiving processor 456, the multi-antenna receiving processor 458 or the controller/processor 459 is used to perform the P energy detection(s) respectively in the P time sub-pool(s) on the first sub-band of the present disclosure; the first node of the present disclosure is a UE.

In one embodiment, at least one of the antenna 420, the receiver 418, the receiving processor 470, the multi-antenna receiving processor 472 or the controller/processor 475 is used to perform the P energy detection(s) respectively in the P time sub-pool(s) on the first sub-band of the present disclosure; the first node of the present disclosure is a base station.

In one embodiment, at least one of the antenna 452, the receiver 454, the receiving processor 456, the multi-antenna receiving processor 458 or the controller/processor 459 is used to determine only based on the Q detection value(s) that the first radio signal is transmitted at the first instant of time on the first sub-band of the present disclosure; the first node of the present disclosure is a UE.

In one embodiment, at least one of the antenna 420, the receiver 418, the receiving processor 470, the multi-antenna receiving processor 472 or the controller/processor 475 is used to determine only based on the Q detection value(s) that the first radio signal is transmitted at the first instant of time on the first sub-band of the present disclosure; the first node of the present disclosure is a base station.

In one embodiment, at least one of the antenna 452, the receiver 454, the receiving processor 456, the multi-antenna receiving processor 458, the controller/processor 459, the memory 460 or the data source 467 is used to receive the first radio signal at the first instant of time on the first sub-band of the present disclosure; at least one of the antenna 420, the transmitter 418, the transmitting processor 416, the multi-antenna transmitting processor 471, the controller/processor 475 or the memory 476 is used to transmit the first radio signal at the first instant of time on the first sub-band of the present disclosure. The first node of the present disclosure is a base station, and the second node of the present disclosure is a UE.

In one embodiment, at least one of the antenna 420, the receiver 418, the receiving processor 470, the multi-antenna receiving processor 472, the controller/processor 475 or the memory 476 is used to receive the first radio signal at the first instant of time on the first sub-band of the present disclosure; at least one of the antenna 452, the transmitter 454, the transmitting processor 468, the multi-antenna transmitting processor 457, the controller/processor 459, the memory 460 or the data source 467 is used to transmit the first radio signal at the first instant of time on the first sub-band of the present disclosure. The first node of the present disclosure is a UE, and the second node of the present disclosure is a base station.

In one embodiment, at least one of the antenna 452, the receiver 454, the receiving processor 456, the multi-antenna receiving processor 458, the controller/processor 459, the memory 460 or the data source 467 is used to monitor the second radio signal at the first instant of time on the second sub-band of the present disclosure; at least one of the antenna 420, the transmitter 418, the transmitting processor 416, the multi-antenna transmitting processor 471, the controller/processor 475 or the memory 476 is used to transmit the second radio signal at the first instant of time on the second sub-band of the present disclosure. The first node of the present disclosure is a base station, and the second node of the present disclosure is a UE.

In one embodiment, at least one of the antenna 420, the receiver 418, the receiving processor 470, the multi-antenna receiving processor 472, the controller/processor 475 or the memory 476 is used to monitor the second radio signal at the first instant of time on the second sub-band of the present disclosure; at least one of the antenna 452, the transmitter 454, the transmitting processor 468, the multi-antenna transmitting processor 457, the controller/processor 459, the memory 460 or the data source 467 is used to transmit the second radio signal at the first instant of time on the second sub-band of the present disclosure. The first node of the present disclosure is a UE, and the second node of the present disclosure is a base station.

In one embodiment, at least one of the antenna 452, the receiver 454, the receiving processor 456, the multi-antenna receiving processor 458, the controller/processor 459, the memory 460 or the data source 467 is used to receive the first signaling of the present disclosure; at least one of the antenna 420, the transmitter 418, the transmitting processor 416, the multi-antenna transmitting processor 471, the controller/processor 475 or the memory 476 is used to transmit the first signaling of the present disclosure.

In one embodiment, at least one of the antenna 452, the receiver 454, the receiving processor 456, the multi-antenna receiving processor 458, the controller/processor 459, the memory 460 or the data source 467 is used to receive the second signaling of the present disclosure; at least one of the antenna 420, the transmitter 418, the transmitting processor 416, the multi-antenna transmitting processor 471, the controller/processor 475 or the memory 476 is used to transmit the second signaling of the present disclosure.

In one embodiment, at least one of the antenna 452, the receiver 454, the receiving processor 456, the multi-antenna receiving processor 458, the controller/processor 459, the memory 460 or the data source 467 is used to receive the first information of the present disclosure; at least one of the antenna 420, the transmitter 418, the transmitting processor 416, the multi-antenna transmitting processor 471, the controller/processor 475 or the memory 476 is used to transmit the first information of the present disclosure.

EMBODIMENT 5

Figure 5:
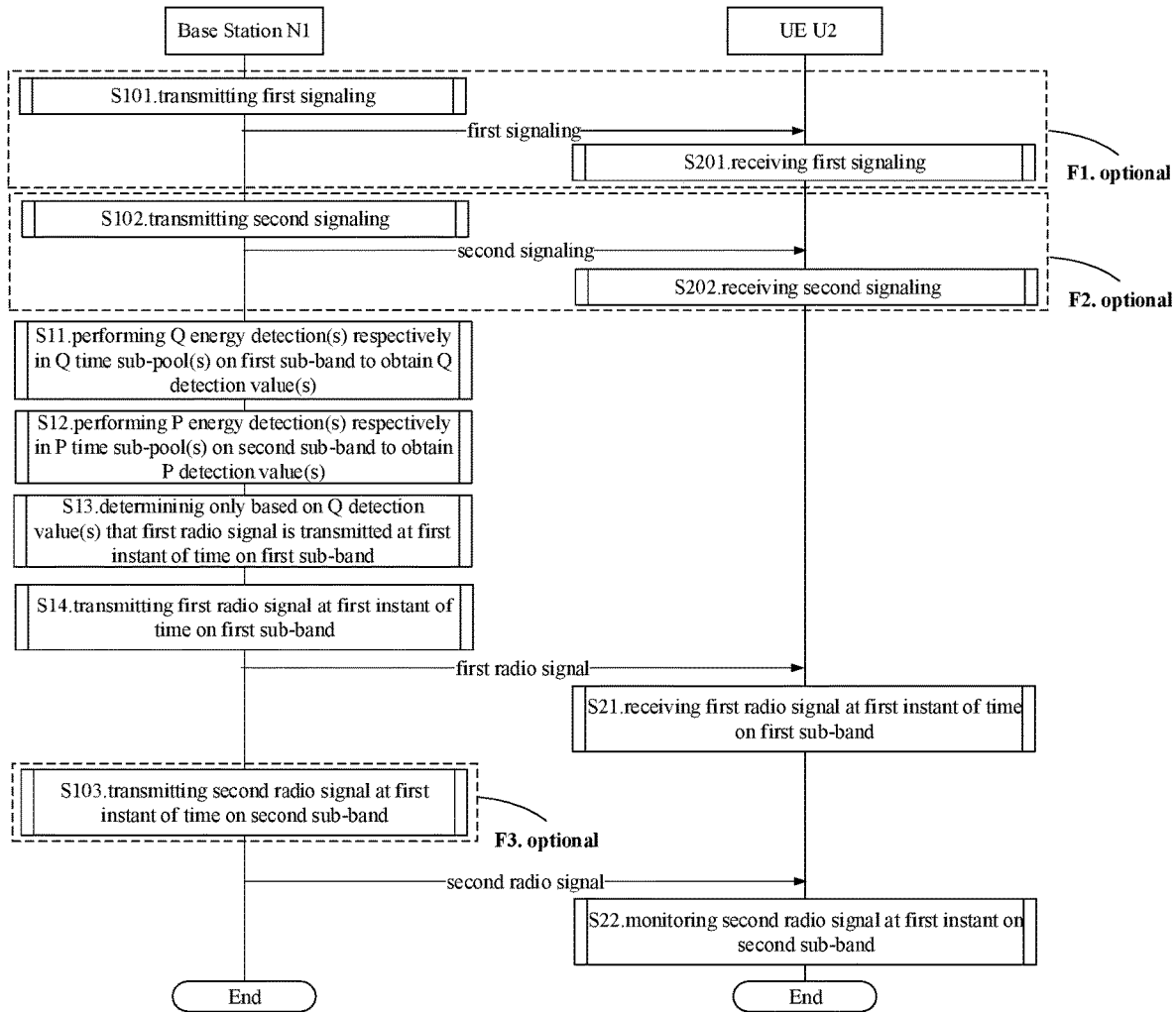
FIG. 5 illustrates a flowchart of wireless transmission according to one embodiment of the present disclosure.

Embodiment 5 illustrates a flowchart of wireless transmission, as shown in FIG. 5. In FIG. 5, a base station N1 is the first node in the present disclosure, while a UE U2 is the second node in the present disclosure; the base station N1 is a maintenance base station for a serving cell of the UE U2. In FIG. 5, steps marked by box F1, box F2 and box F3 are optional, respectively.

The N1 transmits a first signaling in step S101; and transmits a second signaling in step S102; performs Q energy detection(s) respectively in Q time sub-pool(s) on a first sub-band to obtain Q detection value(s) in step S11; and performs P energy detection(s) respectively in P time sub-pool(s) on a second sub-band to obtain P detection value(s) in step S12; and determines only based on the Q detection value(s) that a first radio signal is transmitted at a first instant of time on the first sub-band in step S13; transmits the first radio signal at the first instant of time on the first sub-band in step S14; and transmits a second radio signal at the first instant of time on the second sub-band in step S103.

The U2 receives a first signaling in step S201; and receives a second signaling in step S202; receives a first radio signal at a first instant of time on a first sub-band in step S21; and monitors a second radio signal at the first instant of time on a second sub-band.

In Embodiment 5, the P detection value(s) is(are) used by the N1 for determining whether to transmit the second radio signal at the first instant of time on the second sub-band; each of the Q energy detection(s) is associated with a first antenna port group; when each of the P energy detection(s)

is associated with the first antenna port group, P is P1; when one of the P energy detection(s) is not associated with the first antenna port group, the P is P2; Q is a positive integer; the P1 and the P2 are unequal positive integers; an antenna port group comprises a positive integer number of antenna port(s). The first signaling and the second signaling respectively comprise scheduling information of the first radio signal and scheduling information of the second radio signal.

In one embodiment, the Q detection value(s) is(are) used by the N1 for determining that the first radio signal is transmitted at the first instant of time on the first sub-band; each of Q3 detection value(s) among the Q detection value(s) is lower than a first threshold, wherein Q3 is a candidate integer of K1 candidate integer(s), and K1 is a positive integer.

In one embodiment, the P is the P1, and the P1 is a fixed value when each of the P detection value(s) is lower than a second threshold, the N1 transmits the second radio signal at the first instant of time on the second sub-band, otherwise the N1 drops transmitting the second radio signal at the first instant of time on the second sub-band.

In one subembodiment, if each of the P detection value(s) is lower than the second threshold, the box F3 in FIG. 5 exists; otherwise, the box F3 in FIG. 5 does not exist.

In one embodiment, the P is the P2, and the P2 is greater than P3, wherein the P3 is a candidate integer of K2 candidate integer(s); when each of P3 detection value(s) among the P detection value(s) is lower than a third threshold, the N1 transmits the second radio signal at the first instant of time on the second sub-band, otherwise the N1 drops transmitting the second radio signal at the first instant of time on the second sub-band; the K2 being a positive integer.

In one subembodiment, if each of the P3 detection value(s) among the P detection value(s) is lower than the third threshold, the box F3 in FIG. 5 exists; otherwise the box F3 in FIG. 5 does not exist.

In one embodiment, the monitoring refers to energy detection, namely, whether the second radio signal is detected at the first instant of time on the second sub-band is determined according to energy detection.

In one subembodiment, the energy detection means sensing energy of all radio signals on the second sub-band and averaging in time to obtain a received energy. If the received energy is greater than a first given threshold, it is determined that the second radio signal is detected at the first instant of time on the second sub-band; otherwise it is determined that the second radio signal is not detected at the first instant of time on the second sub-band.

In one embodiment, the second radio signal comprises a first reference signal, and the monitoring refers to a coherent detection conducted using a Reference Signal (RS) sequence of the first reference signal, namely, a coherent detection based on the RS sequence of the first reference signal is performed to determine whether the second radio signal is detected at the first instant of time on the second sub-band.

In one subembodiment, the coherent detection means performing coherent reception on all radio signals on the second sub-band with the RS sequence of the first reference signal, and then measuring energy of signal acquired from the coherent reception. If the energy of signal acquired from the coherent reception is greater than a second given threshold, it is determined that the second radio signal is detected at the first instant of time on the second sub-band; otherwise it is determined that the second radio signal is not detected at the first instant of time on the second sub-band.

In one subembodiment, the first reference signal comprises DeModulation Reference Signals (DMRS).

In one subembodiment, the first reference signal comprises Phase error Tracking Reference Signals (PTRS).

In one embodiment, the monitoring refers to blind detection, which means whether the second radio signal is detected at the first instant of time on the second sub-band is determined based on blind detection.

In one subembodiment, the blind detection means receiving a signal on the second sub-band and performing decoding, if the decoding is determined to be correct according to a check bit, then it is determined that the second radio signal is detected at the first instant of time on the second sub-band; otherwise it is determined that the second radio signal is not detected at the first instant of time on the second sub-band.

In one reference embodiment of the above subembodiment, the check bit is a Cyclic Redundancy Check (CRC) bit.

In one embodiment, the first signaling is transmitted on the first sub-band.

In one embodiment, the first signaling is transmitted on a frequency band other than the first sub-band.

In one embodiment, the first signaling is transmitted on a frequency band deployed on Licensed Spectrum.

In one embodiment, scheduling information of the first radio signal comprises at least one of time-domain resourced occupied, frequency-domain resources occupied, a Modulation and Coding Scheme (MCS), a Hybrid Automatic Repeat reQuest (HARQ) process number, a Redundancy Version (RV), a New Data Indicator (NDI), a DMRS sequence or a transmission antenna port.

In one embodiment, the first signaling is a higher-layer signaling.

In one embodiment, the first signaling is a Radio Resource Control (RRC) signaling.

In one embodiment, the first signaling is a Medium Access Control layer Control Element (MAC CE) signaling.

In one embodiment, the first signaling is a physical layer signaling.

In one embodiment, the first signaling is a dynamic signaling.

In one embodiment, the first signaling is a dynamic signaling used for Downlink Grant, and the first node is a base station.

In one embodiment, the first signaling comprises Downlink Control Information (DCI).

In one embodiment, the first signaling comprises Downlink Grant DCI, and the first node is a base station.

In one embodiment, the second signaling is transmitted on the second sub-band.

In one embodiment, the second signaling is transmitted on a frequency band other than the second sub-band.

In one embodiment, the second signaling is transmitted on a frequency band deployed on Licensed Spectrum.

In one embodiment, scheduling information of the second radio signal comprises at least one of time-domain resources occupied, frequency-domain resources occupied, an MCS, a HARQ process number, an RV, an NDI, a DMRS sequence or a transmission antenna port.

In one embodiment, the second signaling is a higher-layer signaling.

In one embodiment, the second signaling is an RRC signaling.

In one embodiment, the second signaling is a MAC CE signaling.

In one embodiment, the second signaling is a physical layer signaling.

In one embodiment, the second signaling is a dynamic signaling.

In one embodiment, the second signaling is a dynamic signaling used for Downlink Grant, and the first node is a base station.

In one embodiment, the second signaling comprises DCI.

In one embodiment, the second signaling comprises Downlink Grant DCI, and the first node is a base station.

In one embodiment, the first signaling is used to determine the first instant of time.

In one embodiment, the first signaling explicitly indicates the first instant of time.

In one embodiment, the first signaling implicitly indicates the first instant of time.

In one embodiment, the first signaling explicitly indicates that a start time of time resources occupied by the first radio signal is the first instant of time.

In one embodiment, the first signaling implicitly indicates that a start time of time resources occupied by the first radio signal is the first instant of time.

In one embodiment, the second signaling is used to determine the first instant of time.

In one embodiment, the second signaling explicitly indicates the first instant of time.

In one embodiment, the second signaling implicitly indicates the first instant of time.

In one embodiment, the second signaling explicitly indicates that a start time of time resources occupied by the second radio signal is the first instant of time.

In one embodiment, the second signaling implicitly indicates that a start time of time resources occupied by the second radio signal is the first instant of time.

In one embodiment, at least one transmission antenna port of the first radio signal is QCL with an antenna port in the first antenna port group; at least one transmission antenna port of the second radio signal is QCL with an antenna port in a second antenna port group, and each of the P energy detection(s) is associated with the second antenna port group.

In one embodiment, the phrase that each of the P energy detection(s) is associated with the second antenna port group means that the second antenna port group is used to determine Spatial Rx parameters employed in each of the P energy detection(s).

In one embodiment, the phrase that each of the P energy detection(s) is associated with the second antenna port group means that Spatial Tx parameters corresponding to antenna ports in the second antenna port group are used to determine Spatial Rx parameters employed in each of the P energy detection(s).

In one embodiment, the phrase that each of the P energy detection(s) is associated with the second antenna port group means that transmitting spatial filtering corresponding to antenna ports in the second antenna port group is used to determine receiving spatial filtering employed in each of the P energy detection(s).

In one embodiment, the phrase that each of the P energy detection(s) is associated with the second antenna port group means that a spatial coverage of a receiving beam corresponding to each of the P energy detection(s) is located within a set of spatial coverages of transmitting beams corresponding to all antenna ports in the second antenna port group.

In one embodiment, the phrase that each of the P energy detection(s) is associated with the second antenna port group means that a spatial coverage of a transmitting beam corresponding to any antenna port in the second antenna port group is located within a spatial coverage of a receiving beam corresponding to any of the P energy detection(s).

In one embodiment, the phrase that each of the P energy detection(s) is associated with the second antenna port group means that a set of spatial coverages of transmitting beams corresponding to all antenna ports in the second antenna port group overlaps with a spatial coverage of a receiving beam corresponding to each of the P energy detection(s).

In one embodiment, if each of the P energy detection(s) is associated with the first antenna port group, any antenna port in the second antenna port group is QCL with an antenna port in the first antenna port group.

In one embodiment, if each of the P energy detection(s) is associated with the first antenna port group, any antenna port in the second antenna port group is QCL with at least one antenna port in the first antenna port group.

In one embodiment, if each of the P energy detection(s) is associated with the first antenna port group, any antenna port in the second antenna port group is QCL with any antenna port in the first antenna port group.

In one embodiment, if each of the P energy detection(s) is associated with the first antenna port group, the second antenna port group is the first antenna port group.

In one embodiment, if none of the P energy detection(s) is associated with the first antenna port group, any antenna port in the second antenna port group is non-QCL with any antenna port in the first antenna port group.

In one embodiment, the phrase that the two antenna ports are QCL means that the two antenna ports are Quasi Co-Located.

In one embodiment, the phrase that the two antenna ports are QCL means that the two antenna ports are spatial QCL.

In one embodiment, the first radio signal is transmitted on a downlink physical-layer control channel (i.e., a downlink channel only capable of carrying a physical layer signaling), the first node is a base station.

In one subembodiment, the downlink physical-layer control channel is a Physical Downlink Control CHannel (PDCCH).

In one subembodiment, the downlink physical-layer control channel is a short PDCCH (sPDCCH).

In one subembodiment, the downlink physical-layer control channel is a New Radio PDCCH (NR-PDCCH).

In one subembodiment, the downlink physical-layer control channel is a Narrow Band PDCCH (NB-PDCCH).

In one embodiment, the second radio signal is transmitted on a downlink physical-layer control channel (i.e., a downlink channel only capable of carrying a physical layer signaling), the first node is a base station.

In one subembodiment, the downlink physical-layer control channel is a PDCCH.

In one subembodiment, the downlink physical-layer control channel is an sPDCCH.

In one subembodiment, the downlink physical-layer control channel is an NR-PDCCH.

In one subembodiment, the downlink physical-layer control channel is an NB-PDCCH.

In one embodiment, the first radio signal is transmitted on a downlink physical-layer data channel (i.e., a downlink channel capable of carrying physical layer data), the first node is a base station.

In one subembodiment, the downlink physical-layer data channel is a Physical Downlink Shared CHannel (PDSCH).

In one subembodiment, the downlink physical-layer data channel is a short PDSCH (sPDSCH).

In one subembodiment, the downlink physical-layer data channel is a New Radio PDSCH (NR-PDSCH).

In one subembodiment, the downlink physical-layer data channel is a Narrow Band PDSCH (NB-PD SCH).

In one embodiment, a transmission channel for the first radio signal is a DownLink Shared Channel (DL-SCH), the first node is a base station.

In one embodiment, the second radio signal is transmitted on a downlink physical-layer data channel (i.e., a downlink channel capable of carrying physical-layer data), the first node is a base station.

In one subembodiment, the downlink physical-layer data channel is a PDSCH.

In one subembodiment, the downlink physical-layer data channel is an sPDSCH.

In one subembodiment, the downlink physical-layer data channel is an NR-PDSCH.

In one subembodiment, the downlink physical-layer data channel is an NB-PDSCH.

In one embodiment, a transmission channel for the second radio signal is a DL-SCH, the first node is a base station.

In one embodiment, the first signaling is transmitted on a downlink physical-layer control channel (i.e., a downlink channel only capable of carrying a physical layer signaling).

In one subembodiment, the downlink physical-layer control channel is a PDCCH.

In one subembodiment, the downlink physical-layer control channel is an sPDCCH.

In one subembodiment, the downlink physical-layer control channel is an NR-PDCCH.

In one subembodiment, the downlink physical-layer control channel is an NB-PDCCH.

In one embodiment, the first signaling is transmitted on a downlink physical-layer data channel (i.e., a downlink channel capable of carrying physical layer data).

In one subembodiment, the downlink physical-layer data channel is a PDSCH.

In one subembodiment, the downlink physical-layer data channel is an sPDSCH.

In one subembodiment, the downlink physical-layer data channel is an NR-PDSCH.

In one subembodiment, the downlink physical-layer data channel is an NB-PDSCH.

In one embodiment, the second signaling is transmitted on a downlink physical-layer control channel (i.e., a downlink channel only capable of carrying a physical layer signaling).

In one subembodiment, the downlink physical-layer control channel is a PDCCH.

In one subembodiment, the downlink physical-layer control channel is an sPDCCH.

In one subembodiment, the downlink physical-layer control channel is an NR-PDCCH.

In one subembodiment, the downlink physical-layer control channel is an NB-PDCCH.

In one embodiment, the second signaling is transmitted on a downlink physical-layer data channel (i.e., a downlink channel capable of carrying physical layer data).

In one subembodiment, the downlink physical-layer data channel is a PDSCH.

In one subembodiment, the downlink physical-layer data channel is an sPDSCH.

In one subembodiment, the downlink physical-layer data channel is an NR-PDSCH.

In one subembodiment, the downlink physical-layer data channel is an NB-PDSCH.

EMBODIMENT 6

Figure 6:
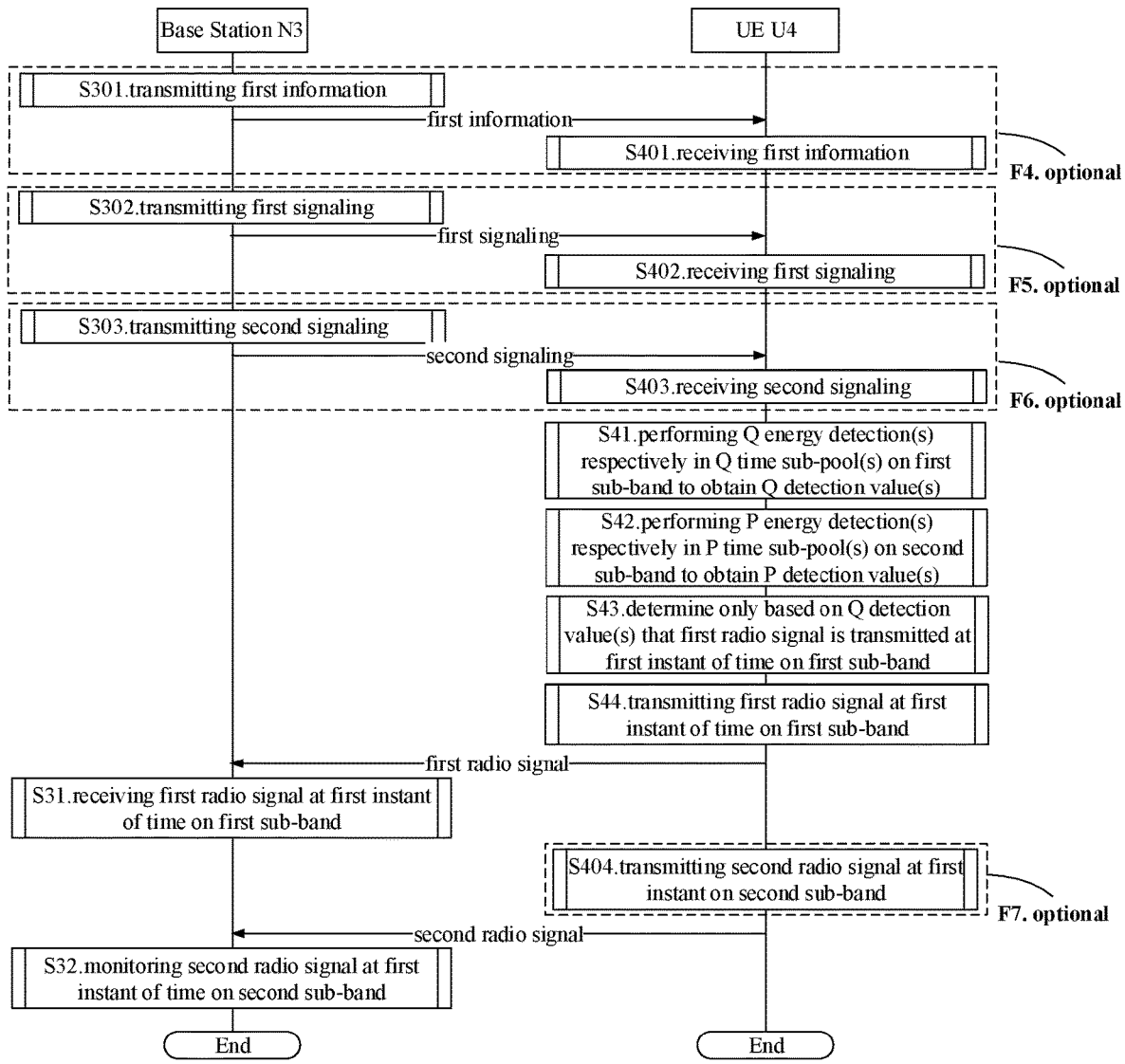
FIG. 6 illustrates a flowchart of wireless transmission according to one embodiment of the present disclosure.

Embodiment 6 illustrates a flowchart of wireless transmission; as shown in FIG. 6. In FIG. 6, a base station N3 is the second node of the present disclosure, a UE U4 is the first node of the present disclosure; and the base station N3 is a maintenance base station for a serving cell of the UE U4. In FIG. 6, steps marked by boxes F4-F7 are optional, respectively.

The N3 transmits first information in step S301; transmits a first signaling in step S302; transmits a second signaling in step S303; receives a first radio signal at a first instant of time on a first sub-band in step S31; and monitors a second radio signal at the first instant of time on a second sub-band in step S32.

The U4 receives first information in step S401; receives a first signaling in step S402; receives a second signaling in step S403; and performs Q energy detection(s) respectively in Q time sub-pool(s) on a first sub-band in step S41 to obtain Q detection value(s); performs P energy detection(s) respectively in P time sub-pool(s) on a second sub-band in step S42 to obtain P detection value(s); and determines only based on the Q detection value(s) that a first radio signal is transmitted at a first instant of time on the first sub-band in step S43; transmits the first radio signal at the first instant of time on the first sub-band in step S44; and transmits a second radio signal at the first instant of time on the second sub-band in step S404.

In Embodiment 6, the P detection value(s) is(are) used to determine whether the second radio signal is transmitted at the first instant of time on the second sub-band; and each of the Q energy detection(s) is associated with a first antenna port group; when each of the P energy detection(s) is associated with the first antenna port group, P is P1; when one of the P energy detection(s) is not associated with the first antenna port group, the P is P2; the P1 and the P2 are unequal positive integers; Q is a positive integer; an antenna port group comprises a positive integer number of antenna port(s). The first signaling and the second signaling respectively comprise scheduling information of the first radio signal and scheduling information of the second radio signal. The first information is used to determine a first sub-band combination, the first sub-band combination comprises a positive integer number of sub-bands, and the first sub-band and the second sub-band both belong to the first sub-band combination.

In one embodiment, the P is the P1, and the P1 is a fixed value; when each of the P detection value(s) is lower than a second threshold, the U4 transmits the second radio signal at the first instant of time on the second sub-band, otherwise the U4 drops transmitting the second radio signal at the first instant of time on the second sub-band.

In one subembodiment, if each of the P detection value(s) is lower than the second threshold, the box F7 in FIG. 6 exists; otherwise, the box F7 in FIG. 6 does not exist.

In one embodiment, the P is the P2, and the P2 is greater than P3, wherein the P3 is a candidate integer of K2 candidate integer(s); when each of P3 detection value(s) among the P detection value(s) is lower than a third threshold, the U4 transmits the second radio signal at the first instant of time on the second sub-band, otherwise the U4 drops transmitting the second radio signal at the first instant of time on the second sub-band; the K2 being a positive integer.

In one subembodiment, if each of the P3 detection value(s) among the P detection value(s) is lower than the third threshold, the box F7 in FIG. 6 exists; otherwise the box F7 in FIG. 6 does not exist.

In one embodiment, scheduling information of the first radio signal comprises at least one of time-domain resources occupied, frequency-domain resources occupied, code-domain resources occupied, cyclic shift, an Orthogonal Cover Code (OCC), a DMRS sequence, a PUCCH format or Uplink control information (UCI) content.

In one embodiment, the first signaling is a dynamic signaling for UpLink Grant, and the first node is a UE.

In one embodiment, the first signaling comprises UpLink Grant DCI, and the first node is a UE.

In one embodiment, scheduling information of the second radio signal comprises at least one of time-domain resources occupied, frequency-domain resources occupied, code-domain resources occupied, cyclic shift, an OCC, a DMRS sequence, a PUCCH format or UCI content.

In one embodiment, the second signaling is a dynamic signaling for UpLink Grant, and the first node is a UE.

In one embodiment, the second signaling comprises UpLink Grant DCI, and the first node is a UE.

In one embodiment, the first information is transmitted on the first sub-band.

In one embodiment, the first information is transmitted on the second sub-band.

In one embodiment, the first information is transmitted on a frequency band other than the first sub-band and the second sub-band.

In one embodiment, the first information is transmitted on a frequency band deployed on Licensed Spectrum.

In one embodiment, the first information is carried by a higher-layer signaling.

In one embodiment, the first information is carried by an RRC signaling.

In one embodiment, the first information is carried by a MAC CE signaling.

In one embodiment, carrier frequencies of all sub-bands comprised in the first sub-band combination constitute a subset of a carrier frequency set defined in 3GPP TS36.104, section 5.7.4.

In one embodiment, the first radio signal is transmitted on an uplink physical-layer control channel (i.e., an uplink channel only capable of carrying a physical layer signaling), and the first node is a UE.

In one subembodiment, the uplink physical-layer control channel is a Physical Uplink Control CHannel (PUCCH).

In one subembodiment, the uplink physical-layer control channel is a short PUCCH (sPUCCH).

In one subembodiment, the uplink physical-layer control channel is a New Radio PUCCH (NR-PUCCH).

In one subembodiment, the uplink physical-layer control channel is a Narrow Band PUCCH (NB-PUCCH).

In one embodiment, the second radio signal is transmitted on an uplink physical-layer control channel (i.e., an uplink channel only capable of carrying a physical layer signaling), and the first node is a UE.

In one subembodiment, the uplink physical-layer control channel is a PUCCH.

In one subembodiment, the uplink physical-layer control channel is an sPUCCH.

In one subembodiment, the uplink physical-layer control channel is an NR-PUCCH.

In one subembodiment, the uplink physical-layer control channel is an NB-PUCCH.

In one embodiment, the first radio signal is transmitted on an uplink physical-layer data channel (i.e., an uplink channel capable of carrying physical layer data), and the first node is a UE.

In one subembodiment, the uplink physical-layer data channel is a Physical Uplink Shared CHannel (PUSCH).

In one subembodiment, the uplink physical-layer data channel is a short PUSCH (sPUSCH).

In one subembodiment, the uplink physical-layer data channel is a New Radio PUSCH (NR-PUSCH).

In one subembodiment, the uplink physical-layer data channel is a Narrow Band PUSCH (NB-PUSCH).

In one embodiment, a transmission channel for the first radio signal is an UpLink Shared Channel (UL-SCH), and the first node is a UE.

In one embodiment, the second radio signal is transmitted on an uplink physical-layer data channel (i.e., an uplink channel capable of carrying physical layer data), and the first node is a UE.

In one subembodiment, the uplink physical-layer data channel is a PUSCH.

In one subembodiment, the uplink physical-layer data channel is an sPUSCH.

In one subembodiment, the uplink physical-layer data channel is an NR-PUSCH.

In one subembodiment, the uplink physical-layer data channel is an NB-PUSCH.

In one embodiment, a transmission channel for the second radio signal is a UL-SCH, and the first node is a UE.

In one embodiment, the first information is transmitted on a downlink physical-layer data channel (i.e., a downlink channel capable of carrying physical layer data).

In one subembodiment, the downlink physical-layer data channel is a PDSCH.

In one subembodiment, the downlink physical-layer data channel is an sPDSCH.

In one subembodiment, the downlink physical-layer data channel is an NR-PDSCH.

In one subembodiment, the downlink physical-layer data channel is an NB-PDSCH.

EMBODIMENT 7

Figure 7:
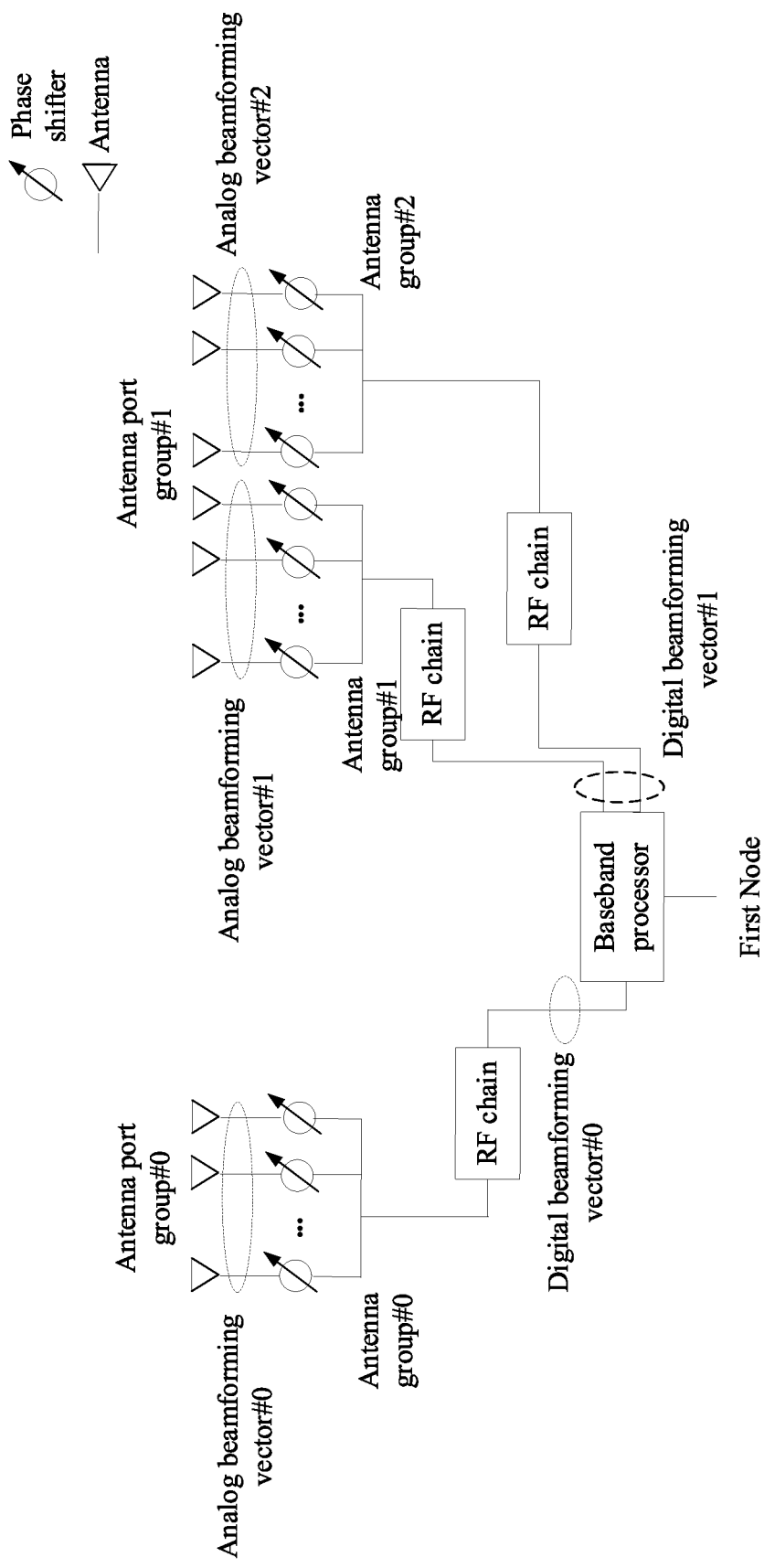
FIG. 7 illustrates a schematic diagram of antenna ports and antenna port groups according to one embodiment of the present disclosure.

Embodiment 7 illustrates a schematic diagram of antenna ports and antenna port groups; as shown in FIG. 7.

In Embodiment 7, an antenna port group comprises a positive integer number of antenna port(s); an antenna port is formed by superimposing antennas in a positive integer number of antenna group(s) through antenna virtualization; an antenna group comprises a positive integer number of antenna(s). An antenna group is connected to a baseband processor via a Radio Frequency (RF) chain, so that different antenna groups correspond to different RF chains. Mapping coefficients of all antennas in a positive integer number of antenna group(s) comprised by a given antenna port to the given antenna port constitute a beamforming vector corresponding to the given antenna port. Mapping coefficients of multiple antennas in any given antenna group among a positive integer number of antenna group(s) comprised by the given antenna port to the given antenna port constitute an analog beamforming vector of the given antenna group. Analog beamforming vector(s) respectively corresponding to the positive integer number of antenna group(s) comprised by the given antenna port is(are) diagonally arranged to form an analog beamforming matrix corresponding to the given antenna port. Mapping coefficient(s) of the positive integer number of antenna group(s) comprised by the given antenna port to the given antenna port constitutes(constitute) a digital beamforming vector corresponding to the given antenna port. A beamforming vector corresponding to the given antenna port is a product of an analog beamforming matrix corresponding to the given antenna port and a digital beamforming vector corresponding to the given antenna port. Each of antenna ports in an antenna port group is composed of (a) same antenna group(s), while different antenna ports in a same antenna port group correspond to different beamforming vectors.

Two antenna port groups are presented in FIG. 7, which are antenna port group #0 and antenna port group #1. Herein, the antenna port group #0 is composed of antenna group #0, while the antenna port group #1 is composed of antenna group #1 and antenna group #2. Mapping coefficients of multiple antennas in the antenna group #0 to the antenna port group #0 constitute an analog beamforming vector #0, while a mapping coefficient of the antenna group #0 to the antenna port group #0 constitutes a digital beamforming vector #0. Mapping coefficients of multiple antennas in the antenna group #1 and of multiple antennas in the antenna group #2 to the antenna port group #1 respectively constitute an analog beamforming vector #1 and an analog beamforming vector #2; and mapping coefficients of the antenna group #1 and of the antenna group #2 to the antenna port group #1 constitute a digital beamforming vector #1. A beamforming vector corresponding to any antenna port in the antenna port group #0 is a product of the analog beamforming vector #0 and the digital beamforming vector #0. A beamforming vector corresponding to any antenna port in the antenna port group #1 is a product of the digital beamforming vector #1 and an analog beamforming matrix formed by diagonally arrangement of the analog beamforming vector #1 and the analog beamforming vector #2.

In one embodiment, an antenna port group only comprises one antenna group, which is a RF chain, for instance, the antenna port group #0 in FIG. 7.

In one subembodiment, an analog beamforming matrix corresponding to an antenna port in the antenna port group is dimensionally reduced to an analog beamforming vector, and a digital beamforming vector corresponding to an antenna port in the antenna port group is dimensionally reduced to a scaler, and a beamforming vector corresponding to an antenna port in the antenna port group is equivalent to a corresponding analog beamforming vector. For example, the antenna port group #0 in FIG. 7 only comprises the antenna group #0, the digital beamforming vector in FIG. 7 is dimensionally reduced to a scaler, and a beamforming vector corresponding to an antenna port in the antenna port group #0 is the analog beamforming vector #0.

In one subembodiment, the antenna port group comprises one antenna port.

In one embodiment, an antenna port group comprises multiple antenna groups, i.e., multiple RF chains, as exemplified by the antenna port group #1 in FIG. 7.

In one subembodiment, the antenna port group comprises multiple antenna ports.

In one subembodiment, each antenna port in the antenna port group corresponds to a same analog beamforming matrix.

In one subembodiment, each antenna port in the antenna port group corresponds to a different digital beamforming vector.

In one embodiment, antenna ports respectively comprised by different antenna port groups correspond to different analog beamforming matrixes.

In one embodiment, small-scale channel parameters experienced by one radio signal transmitted by an antenna port can be used to infer small-scale channel parameters experienced by another radio signal transmitted by the antenna port.

In one subembodiment, the small-scale channel parameters include one or more of Channel Impulse Response (CIR), Precoding Matrix Indicator (PMI), CQI, and Rank Indicator (RI).

In one embodiment, any two antenna ports in an antenna port group are QCL.

In one embodiment, that two antenna ports are QCL means that the two antenna ports are Quasi Co-Located.

In one embodiment, the phrase that the two antenna ports are QCL means that the two antenna ports are spatial QCL.

In one embodiment, the phrase that the two antenna ports are QCL means that all or part of large-scale properties of a radio signal transmitted by one of the two antenna ports can be used to infer all or part of large-scale properties of a radio signal transmitted by the other of the two antenna ports; the large-scale properties include multi-antenna-related large-properties and multi-antenna-unrelated large-properties.

In one embodiment, multi-antenna-related large-scale properties of a given radio signal comprise one or more of angle of arrival, angle of departure, spatial correlation, Spatial Tx parameters and Spatial Rx parameters.

In one embodiment, Spatial Tx parameters comprise one or more of an antenna port, an antenna port group, a transmitting beam, a transmission analog beamforming matrix, a transmission analog beamforming vector, a transmission beamforming vector and a transmitting spatial filtering.

In one embodiment, Spatial Rx parameters comprise one or more of a receiving beam, a reception analog beamforming matrix, a reception analog beamforming vector, a reception beamforming vector and a receiving spatial filtering.

In one embodiment, multi-antenna-unrelated large-scale properties of a given radio signal comprise one or more of delay spread, Doppler spread, Doppler shift, path loss, average gain and average delay.

In one embodiment, the phrase that the two antenna ports are QCL means that the two antenna ports at least share a same QCL parameter, which includes multi-antenna-related QCL parameters and multi-antenna-unrelated QCL parameters.

In one embodiment, the multi-antenna-related QCL parameters comprise one or more of angle of arrival, angle of departure, spatial correlation, Spatial Tx parameters, and Spatial Rx parameters.

In one embodiment, the multi-antenna-unrelated QCL parameters comprise one or more of delay spread, Doppler spread, Doppler shift, path loss and average gain.

In one embodiment, the phrase that two antenna ports are QCL means that at least one QCL parameter of one of the two antenna ports can be used to infer at least one QCL parameter of the other of the two antenna ports.

In one embodiment, the phrase that two antenna ports are QCL means that all or part of multi-antenna-related large-scale properties of a radio signal transmitted by one of the two antenna ports can be used to infer all or part of multi-antenna-related large-scale properties of a radio signal transmitted by the other of the two antenna ports.

In one embodiment, the phrase that two antenna ports are QCL means that there is at least one same multi-antenna QCL parameter (spatial QCL parameter) shared by the two antenna ports.

In one embodiment, the phrase that two antenna ports are QCL means that at least one multi-antenna-related QCL parameter of one of the two antenna ports can be used to infer at least one multi-antenna-related QCL parameter of the other of the two antenna ports.

EMBODIMENT 8

Figure 8:
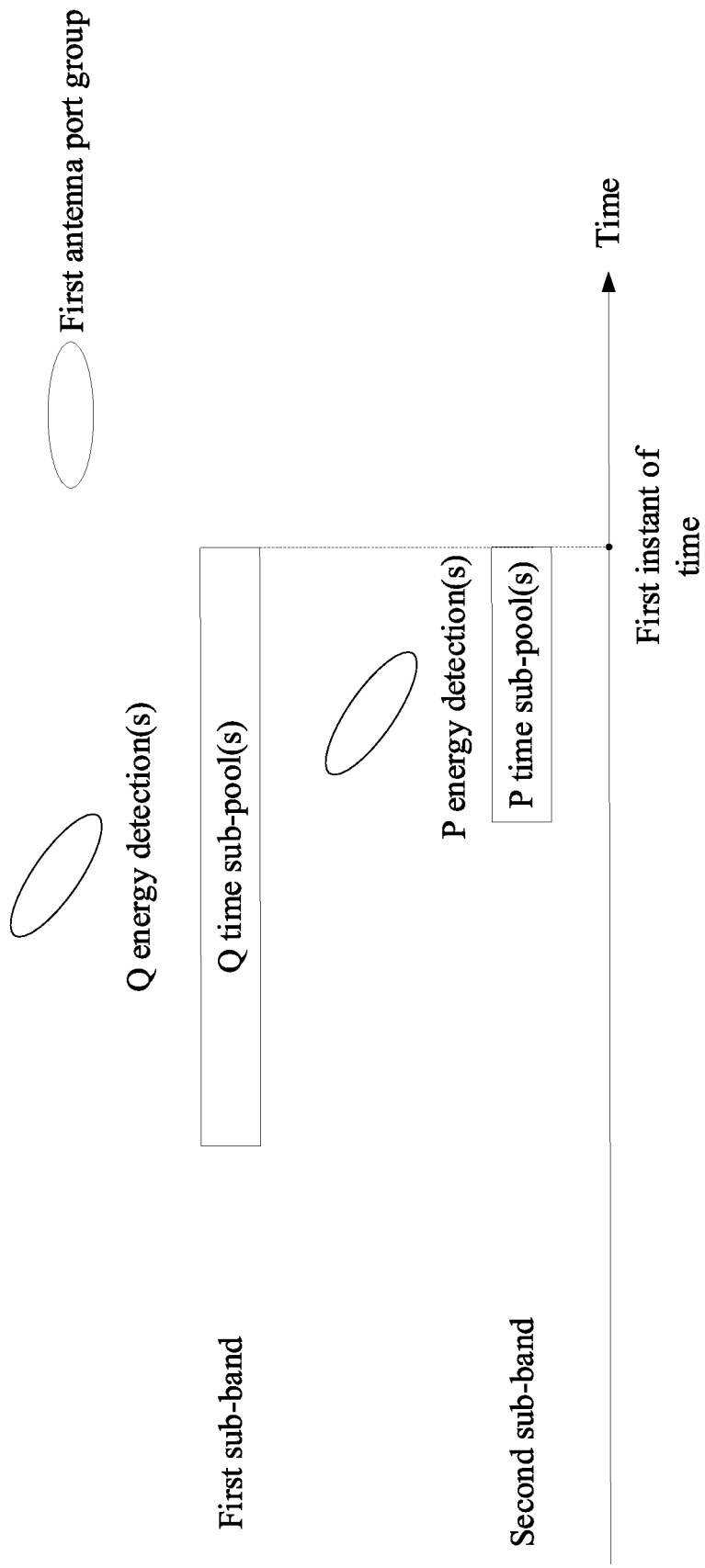
FIG. 8 illustrates a schematic diagram of how Q time sub-pool(s), P time sub-pool(s) and a first instant of time relate to one another in time sequence according to one embodiment of the present disclosure.

Embodiment 8 illustrates a schematic diagram of how Q time sub-pool(s), P time sub-pool(s) and a first instant of time relate to one another in time sequence; as shown in FIG. 8.

In Embodiment 8, the first node of the present disclosure performs Q energy detection(s) respectively in the Q time sub-pool(s) on the first sub-band of the present disclosure to obtain Q detection value(s); the first node of the present disclosure performs P energy detection(s) respectively in the P time sub-pool(s) on the second sub-band of the present disclosure to obtain P detection value(s). The first node determines only based on the Q detection value(s) that a first radio signal is transmitted at a first instant of time on the first sub-band; and the first node determines based on the P detection value(s) whether a second radio signal is transmitted at the first instant of time on the second sub-band. Each of the Q energy detection(s) is associated with a first antenna port group; and each of the P energy detection(s) is associated with the first antenna port group, the P being the P1 of the present disclosure. In FIG. 8, a blank ellipsis framed with thin solid curves represents the first antenna port group.

In one embodiment, the first instant of time is an end time of the Q time sub-pool(s).

In one embodiment, the first instant of time is an end time of the P time sub-pool(s).

In one embodiment, the Q time sub-pool(s) and the P time sub-pool(s) end at the same instant of time.

In one embodiment, the P1 is equal to 2.

In one embodiment, the P1 is less than the Q.

In one embodiment, any two antenna ports in the first antenna port group are QCL.

In one embodiment, the first antenna port group comprises one antenna port.

In one embodiment, the first antenna port group comprises a positive integer number of antenna port(s).

In one embodiment, at least one transmission antenna port of the first radio signal is QCL with at least one antenna port in the first antenna port group.

In one embodiment, any transmission antenna port of the first radio signal is QCL with an antenna port in the first antenna port group.

In one embodiment, any transmission antenna port of the first radio signal is QCL with at least one antenna port in the first antenna port group.

In one embodiment, any transmission antenna port of the first radio signal is QCL with any antenna port in the first antenna port group.

In one embodiment, at least one transmission antenna port of the second radio signal is QCL with at least one antenna port in the first antenna port group.

In one embodiment, any transmission antenna port of the second radio signal is QCL with an antenna port in the first antenna port group.

In one embodiment, any transmission antenna port of the second radio signal is QCL with at least one antenna port in the first antenna port group.

In one embodiment, any transmission antenna port of the second radio signal is QCL with any antenna port in the first antenna port group.

In one embodiment, any antenna port in the second antenna port group of the present disclosure is QCL with an antenna port in the first antenna port group.

In one embodiment, any antenna port in the second antenna port group of the present disclosure is QCL with at least one antenna port in the first antenna port group.

In one embodiment, any antenna port in the second antenna port group of the present disclosure is QCL with any antenna port in the first antenna port group.

In one embodiment, the second antenna port group of the present disclosure is the first antenna port group.

In one embodiment, at least one transmission antenna port of the second radio signal is QCL with at least one antenna port in the second antenna port group of the present disclosure.

In one embodiment, any transmission antenna port of the second radio signal is QCL with an antenna port in the second antenna port group of the present disclosure.

In one embodiment, any transmission antenna port of the second radio signal is QCL with at least one antenna port in the second antenna port group of the present disclosure.

In one embodiment, any transmission antenna port of the second radio signal is QCL with any antenna port in the second antenna port group of the present disclosure.

EMBODIMENT 9

Figure 9:
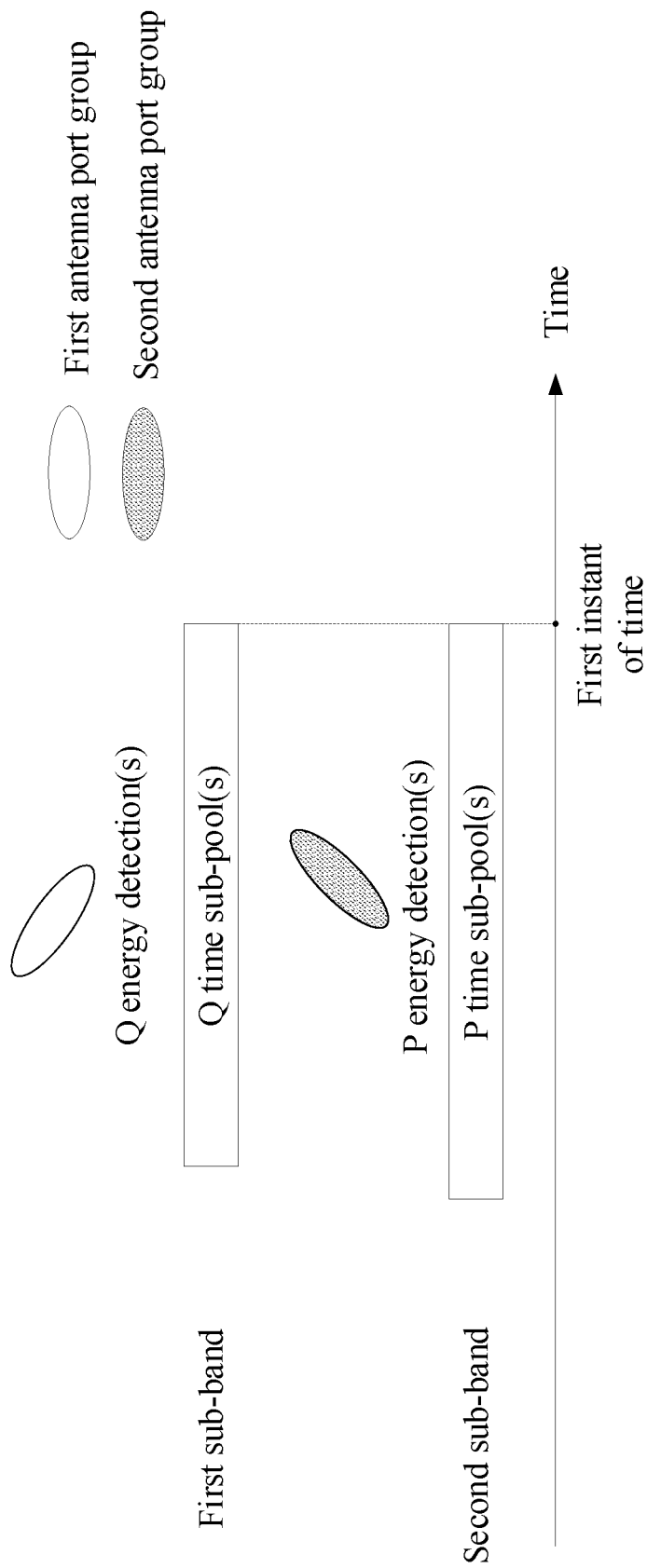
FIG. 9 illustrates a schematic diagram of how Q time sub-pool(s), P time sub-pool(s) and a first instant of time relate to one another in time sequence according to one embodiment of the present disclosure.

Embodiment 9 illustrates schematic diagram of how Q time sub-pool(s), P time sub-pool(s) and a first instant of time relate to one another in time sequence; as shown in FIG. 9.

In Embodiment 9, the first node of the present disclosure performs Q energy detection(s) respectively in the Q time sub-pool(s) on the first sub-band of the present disclosure to obtain Q detection value(s); the first node of the present disclosure performs P energy detection(s) respectively in the P time sub-pool(s) on the second sub-band of the present disclosure to obtain P detection value(s). The first node determines only based on the Q detection value(s) that a first radio signal is transmitted at a first instant of time on the first sub-band; and the first node determines based on the P detection value(s) whether a second radio signal is transmitted at the first instant of time on the second sub-band. Each of the Q energy detection(s) is associated with a first antenna port group; and none of the P energy detection(s) is associated with the first antenna port group, the P being the P2 of the present disclosure. Each of the P energy detection(s) is associated with the second antenna port group. In FIG. 9, a blank ellipsis framed with thin solid curves represents the first antenna port group, while a cross-filled ellipsis framed with thin solid curves represents the second antenna port group.

In one embodiment, the P2 is unrelated to the Q.

In one embodiment, the P2 is greater than the Q.

In one embodiment, the P2 is less than the Q.

In one embodiment, the P2 is equal to the Q.

In one embodiment, any two antenna ports in the second antenna port group are QCL.

In one embodiment, any antenna port in the second antenna port group is non-QCL with any antenna port in the first antenna port group.

In one embodiment, the second antenna port group comprises one antenna port.

In one embodiment, the second antenna port group comprises a positive integer number of antenna port(s).

In one embodiment, at least one transmission antenna port of the second radio signal and at least one antenna port in the second antenna port group are QCL.

In one embodiment, any transmission antenna port of the second radio signal and one antenna port in the second antenna port group are QCL.

In one embodiment, any transmission antenna port of the second radio signal and at least one antenna port in the second antenna port group are QCL.

In one embodiment, at least one transmission antenna port of the second radio signal and any antenna port in the second antenna port group are QCL.

EMBODIMENT 10

Figure 10:
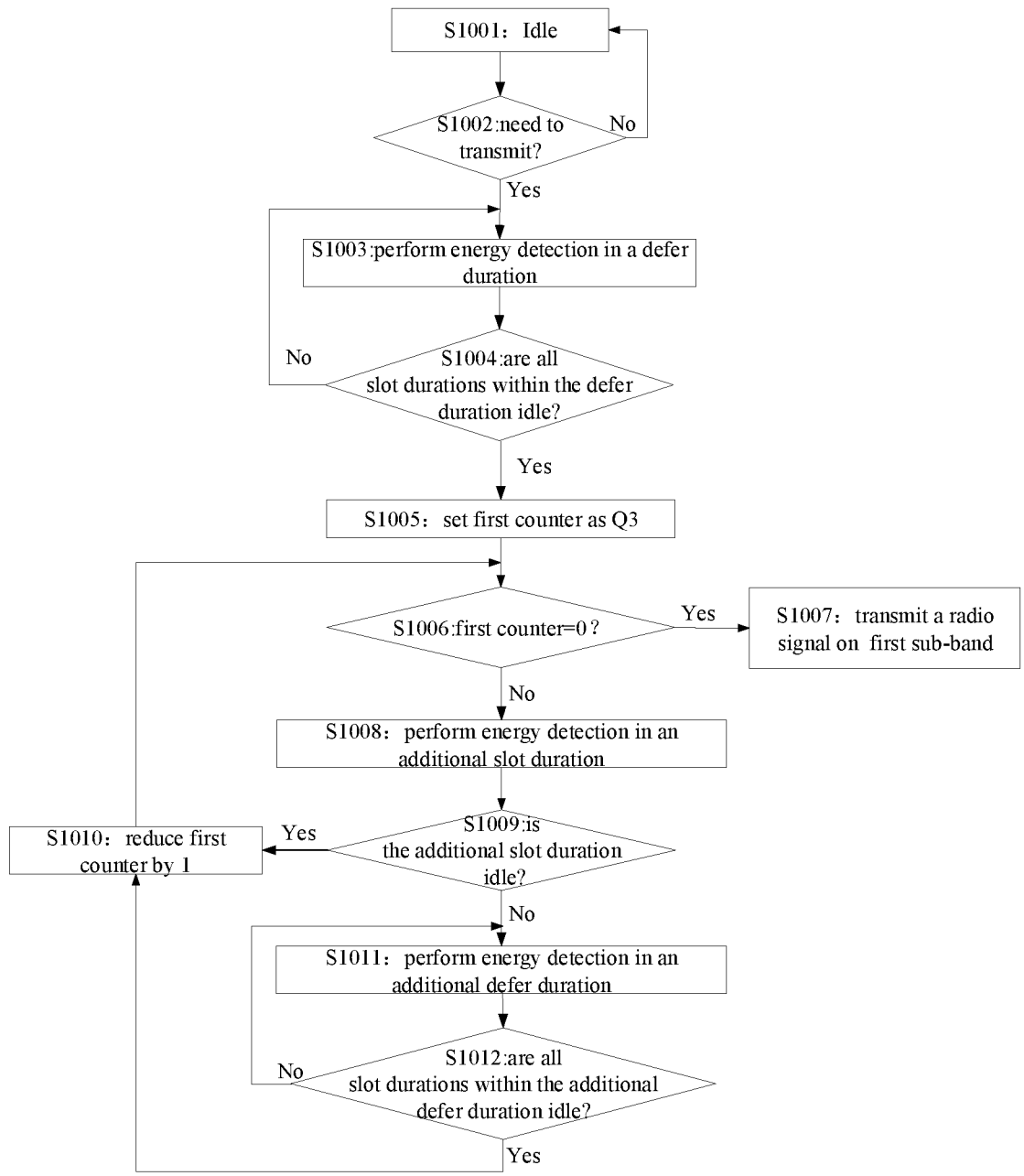
FIG. 10 illustrates a schematic diagram of Q energy detection(s) according to one embodiment of the present disclosure.

Embodiment 10 illustrates a schematic diagram of Q energy detection(s); as shown in FIG. 10.

In one embodiment 10, the first node of the present disclosure performs Q energy detection(s) respectively in Q time sub-pool(s) on a first sub-band of the present disclosure to obtain Q detection value(s). Each of Q3 detection value(s) among the Q detection value(s) is lower than a first threshold, wherein Q3 is a candidate integer of K1 candidate integer(s), and K1 is a positive integer. Q3 time sub-pool(s) is(are) time sub-pool(s) respectively corresponding to the Q3 detection value(s) among the Q time sub-pool(s). The process of the Q energy detection(s) can be depicted by the flowchart in FIG. 10.

In FIG. 10, the first node of the present disclosure is idle in step S1001; determined in step S1002 whether there is need to transmit; performs energy detection in a defer duration on the first sub-band in step S1003; and determine in step S1004 whether all slot durations within the defer duration are idle, if yes, move forward to step S1005 to set a first counter as the Q3; otherwise go back to step S1004; the first node determine in step S1006 whether the first counter is 0, if yes, move forward to step S1007 to transmit a radio signal on the first sub-band; otherwise move forward to step S1008 to perform energy detection in an additional slot duration on the first sub-band; the first node then determine in step S1009 whether the additional slot duration is idle, if yes, move forward to step 1010 to reduce the first counter by 1 and go back to step S1006; otherwise move forward to step S1011 to perform energy detection in an additional defer duration on the first sub-band; the first node determine in step S1012 whether all slot durations within the additional defer duration are idle, if yes, move back to step S1010; otherwise go back to step S1011.

In Embodiment 10, a first given duration comprises a positive integer number of time sub-pool(s) among the Q time sub-pool(s); the first given duration is any duration of all defer durations, all additional slot durations and all additional defer durations comprised in FIG. 10. A second given duration comprises a time sub-pool of the Q3 time sub-pool(s); the second given duration is any duration of all additional slot durations and all additional defer durations comprised in FIG. 10, which are determined to be idle through energy detection.

In one embodiment, any slot duration in a given duration comprises one of the Q time sub-pool(s); the given duration is any duration of all defer durations, all additional slot durations and all additional defer durations comprised in FIG. 10.

In one embodiment, performing energy detection within a given duration means performing energy detection in each slot duration within the given duration; the given duration is any duration of all defer durations, all additional slot durations and all additional defer durations comprised in FIG. 10.

In one embodiment, performing energy detection within a given duration means performing energy detection in each time sub-pool within the given duration; the given duration is any duration of all defer durations, all additional slot durations and all additional defer durations comprised in FIG. 10. Each time sub-pool within the given duration belongs to the Q time sub-pool(s) and the energy detection performed in each time sub-pool is one of the Q energy detection(s) that corresponds to each time sub-pool.

In one embodiment, a given duration being determined to be idle through energy detection means that all slot durations comprised in the given duration are determined to be idle through energy detection; the given duration is any duration of all defer durations, all additional slot durations and all additional defer durations comprised in FIG. 10.

In one embodiment, a given duration being determined to be idle through energy detection means that each detection value obtained through energy detection in each time sub-pool comprised in the given duration is lower than the first threshold; the given duration is any duration of all defer durations, all additional slot durations and all additional defer durations comprised in FIG. 10. Each time sub-pool within the given duration belongs to the Q time sub-pool(s) and each detection value is one of the Q detection value(s) that corresponds to each time sub-pool.

In one embodiment, a given slot duration being determined to be idle through energy detection means that the first node senses power of all radio signals in a time unit on the first sub-band and averages in time, from which a received power obtained is lower than the first threshold; the given time unit is a consecutive time duration within the given slot duration.

In one subembodiment, the given time unit lasts no shorter than 4 µs.

In one embodiment, a given slot duration being determined to be idle through energy detection means that the first node senses energy of all radio signals in a time unit on the first sub-band and averages in time, from which a received energy obtained is lower than the first threshold; the given time unit is a consecutive time duration within the given slot duration.

In one subembodiment, the given time unit lasts no shorter than 4 µs.

In one embodiment, a given slot duration being determined to be idle through energy detection means that the first node performs energy detection in a time sub-pool comprised by the given slot duration, from which a detection value obtained is lower than the first threshold; the time sub-pool belongs to the Q time sub-pool(s), and the detection value is one of the Q detection value(s) that corresponds to the time sub-pool.

In one embodiment, a defer duration lasts 16 µs plus S1 time(s) of 9 µs, where S1 is a positive integer.

In one subembodiment, a defer duration comprises S1+1 time sub-pools out of the Q time sub-pools.

In one reference embodiment of the above subembodiment, among the S1+1 time sub-pools a first time sub-pool lasts no longer than 16 µs, while each time sub-pool of the other S1 time sub-pool(s) lasts no longer than 9 µs.

In one subembodiment, the S1 is one of 1, 2, 3 and 7.

In one embodiment, a defer duration comprises multiple slot durations.

In one subembodiment, a first slot duration and a second slot duration among the multiple slot durations are non-contiguous.

In one subembodiment, a first slot duration and a second slot duration among the multiple slot durations are spaced by a time interval of 7 µs.

In one embodiment, an additional defer duration lasts 16 µs plus S2 time(s) of 9 µs, where S2 is a positive integer.

In one subembodiment, an additional defer duration comprises S2+1 time sub-pools out of the Q time sub-pools.

In one reference embodiment of the above subembodiment, among the S2+1 time sub-pools a first time sub-pool lasts no longer than 16 µs, while each time sub-pool of the other S2 time sub-pool(s) lasts no longer than 9 µs.

In one subembodiment, the S2 is one of 1, 2, 3 and 7.

In one embodiment, a defer duration lasts as long as an additional defer duration.

In one embodiment, the S1 is equal to the S2.

In one embodiment, an additional defer duration comprises multiple slot durations.

In one subembodiment, a first slot duration and a second slot duration among the multiple slot durations are non-contiguous.

In one subembodiment, a first slot duration and a second slot duration among the multiple slot durations are spaced by a time interval of 7 μs.

In one embodiment, a slot duration lasts 9 μs.

In one embodiment, a slot duration comprises one of the Q time sub-pool(s).

In one subembodiment, the time sub-pool comprised lasts no longer than 9 μs.

In one embodiment, an additional slot duration lasts 9 μs.

In one embodiment, an additional slot duration comprises one of the Q time sub-pool(s).

In one subembodiment, the time sub-pool comprised lasts no longer than 9 μs.

In one embodiment, each of the Q energy detection(s) is energy detection in Cat 4 LBT, wherein the detailed definition of the Cat 4 LBT can be found in 3GPP TR36.889.

In one embodiment, each of the Q energy detection(s) is energy detection in Type 1 UL channel access procedure, the first node is a UE, and for the detailed definition of the Type 1 UL channel access procedure, refer to 3GPP TS36.213, section 15.2.

In one embodiment, the K1 is one of numbers 3, 7, 15, 31, 63, 127, 255, 511, and 1023.

In one embodiment, the K1 is $CW_p$, the $CW_p$ is contention window size, and the specific meaning of the $CW_p$ can be found in 3GPP TS36.213, section 15.

In one subembodiment, the K1 is $CW_p$ in Cat 4 LBT, and the specific meaning of the Cat 4 LBT can be found in 3GPP TR36.889.

In one embodiment, the K1 candidate integer(s) is(are) respectively non-negative integers.

In one embodiment, the K1 candidate integer(s) is(are) 0, 1, 2 . . . , and K1-1.

In one embodiment, the first node selects the Q3 from the K1 candidate integers at random.

In one embodiment, any of the K1 candidate integers is chosen as the Q3 at equal probability.

In one embodiment, time-domain resources occupied by any of the Q time sub-pool(s) are contiguous.

In one embodiment, the Q time sub-pools are mutually orthogonal (that is, non-overlapped) in time domain.

In one embodiment, a time duration of any of the Q time sub-pool(s) is either 16 μs or 9 μs.

In one embodiment, there are at least two time sub-pools of unequal time durations among the Q time sub-pools.

In one embodiment, any two of the Q time sub-pools are of equal time duration.

In one embodiment, time-domain resources occupied by the Q time sub-pools are contiguous.

In one embodiment, there are at least two adjacent time sub-pools among the Q time sub-pools by which time-domain resources occupied are not contiguous.

In one embodiment, any two adjacent time sub-pools of the Q time sub-pools occupy time-domain resources that are not contiguous.

In one embodiment, any of the Q time sub-pool(s) is a slot duration.

In one embodiment, any of the Q time sub-pool(s) is a $T_{sl}$, wherein the $T_{sl}$ is a slot duration, and for the detailed definition of the $T_{sl}$, refer to 3GPP TS36.213, section 15.

In one embodiment, any time sub-pool other than an earliest time sub-pool among the Q time sub-pools is a slot duration.

In one embodiment, any time sub-pool other than an earliest time sub-pool among the Q time sub-pools is a $T_{sl}$, wherein the $T_{sl}$ is a slot duration, and for the detailed definition of the $T_{sl}$, refer to 3GPP TS36.213, section 15.

In one embodiment, of the Q time sub-pool(s) there is at least one time sub-pool lasting 16 μs.

In one embodiment, of the Q time sub-pool(s) there is at least one time sub-pool lasting 9 μs.

In one embodiment, an earliest time sub-pool of the Q time sub-pools lasts 16 μs.

In one embodiment, a latest time sub-pool of the Q time sub-pools lasts 9 μs.

In one embodiment, the Q time sub-pool(s) comprises (comprise) listening time in Cat 4 LBT.

In one embodiment, the Q time sub-pool(s) comprises (comprise) slot durations comprised in a defer duration and slot durations comprised in backoff time in Cat 4 LBT.

In one embodiment, the Q time sub-pool(s) comprises (comprise) slot durations comprised in a defer duration and slot durations comprised in backoff time in Type 1 UL channel access procedure.

In one embodiment, the Q time sub-pool(s) comprises (comprise) slot durations in both initial Clear Channel Assessment (CCA) and Enhanced Clear Channel Assessment (eCCA).

In one embodiment, the Q detection value(s) is(are) respectively Q received power(s) obtained by the first node's sensing power of all radio signals in Q time unit(s) on the first sub-band and then averaging in time; the Q time unit(s) is(are) Q consecutive time duration(s) respectively in the Q time sub-pool(s).

In one subembodiment, any of the Q time unit(s) lasts no shorter than 4 μs.

In one embodiment, the Q detection value(s) is(are) respectively Q received energy(energies) obtained by the first node's sensing energy of all radio signals in Q time unit(s) on the first sub-band and then averaging in time; the Q time unit(s) is(are) Q consecutive time duration(s) respectively in the Q time sub-pool(s).

In one subembodiment, any of the Q time unit(s) lasts no shorter than 4 μs.

In one embodiment, the Q3 is a non-negative integer no greater than the Q.

In one embodiment, the Q3 is a non-negative integer less than the Q.

In one embodiment, the Q3 is greater than 0.

In one embodiment, the Q3 is equal to 0.

In one embodiment, the Q is greater than 1.

In one embodiment, the Q detection value(s) is(are) measured by dBm.

In one embodiment, the Q detection value(s) is(are) measured by mW.

In one embodiment, the Q detection value(s) is(are) measured by J.

In one embodiment, the first threshold is measured by dBm.

In one embodiment, the first threshold is measured by mW.

In one embodiment, the first threshold is measured by J.

In one embodiment, the first threshold is equal to or less than −72 dBm.

In one embodiment, the first threshold is any value equal to or less than a first given value.

In one subembodiment, the first given value is predefined.

In one subembodiment, the first given value is configured by a higher-layer signaling, and the first node is a UE.

In one embodiment, the first threshold is selected liberally by the first node given that the first threshold is equal to or less than a first given value.

In one subembodiment, the first given value is predefined.

In one subembodiment, the first given value is configured by a higher-layer signaling, and the first node is a UE.

In one embodiment, of detection value(s) not belonging to the Q3 detection value(s) among the Q detection values, at least one detection value is lower than the first threshold.

In one embodiment, each of the Q detection value(s) is lower than the first threshold.

In one embodiment, of detection value(s) not belonging to the Q3 detection value(s) among the Q detection values, there is at least one detection value not lower than the first threshold.

In one embodiment, the Q3 time sub-pool(s) only comprises(comprise) slot durations in eCCA.

In one embodiment, the Q time sub-pools comprise the Q3 time sub-pool(s) and Q4 time sub-pool(s), and any of the Q4 time sub-pool(s) is not one of the Q3 time sub-pool(s); Q4 is a positive integer no greater than the Q minus the Q3.

In one subembodiment, the Q4 is equal to the Q minus the Q3.

In one subembodiment, the Q4 time sub-pool(s) comprises(comprise) slot durations in initial CCA.

In one subembodiment, positions of the Q4 time sub-pools among the Q time sub-pools are consecutive.

In one subembodiment, the Q4 time sub-pool(s) comprises(comprise) all slot durations within all defer durations in FIG. 10.

In one subembodiment, the Q4 time sub-pool(s) comprises(comprise) slot durations within at least one of additional defer durations in FIG. 10.

In one subembodiment, the Q4 time sub-pool(s) comprises(comprise) at least one of additional slot durations in FIG. 10.

In one embodiment, the Q3 time sub-pool(s) respectively belongs(belong) to Q3 sub-pool set(s), any of the Q3 sub-pool set(s) comprises a positive integer number of time sub-pool(s) of the Q time sub-pool(s); and a detection value corresponding to any time sub-pool in the Q3 sub-pool set(s) is lower than the first threshold.

In one subembodiment, at least one of the Q3 sub-pool set(s) comprises one time sub-pool.

In one subembodiment, at least one of the Q3 sub-pool set(s) comprises more than one time sub-pool.

In one subembodiment, at least two of the Q3 sub-pool sets comprise unequal numbers of time sub-pools.

In one subembodiment, none of the Q sub-pools belongs to two of the Q3 sub-pool sets simultaneously.

In one subembodiment, all time sub-pools in any of the Q3 sub-pool sets belong to an additional defer duration or an additional slot duration determined to be idle through energy detection.

In one subembodiment, among time sub-pool(s) of the Q time sub-pool(s) not belonging to any of the Q3 sub-pool set(s) there is at least one time sub-pool corresponding to a detection value lower than the first threshold.

In one subembodiment, among time sub-pool(s) of the Q time sub-pool(s) not belonging to any of the Q3 sub-pool set(s) there is at least one time sub-pool corresponding to a detection value not lower than the first threshold.

EMBODIMENT 11

Figure 11:
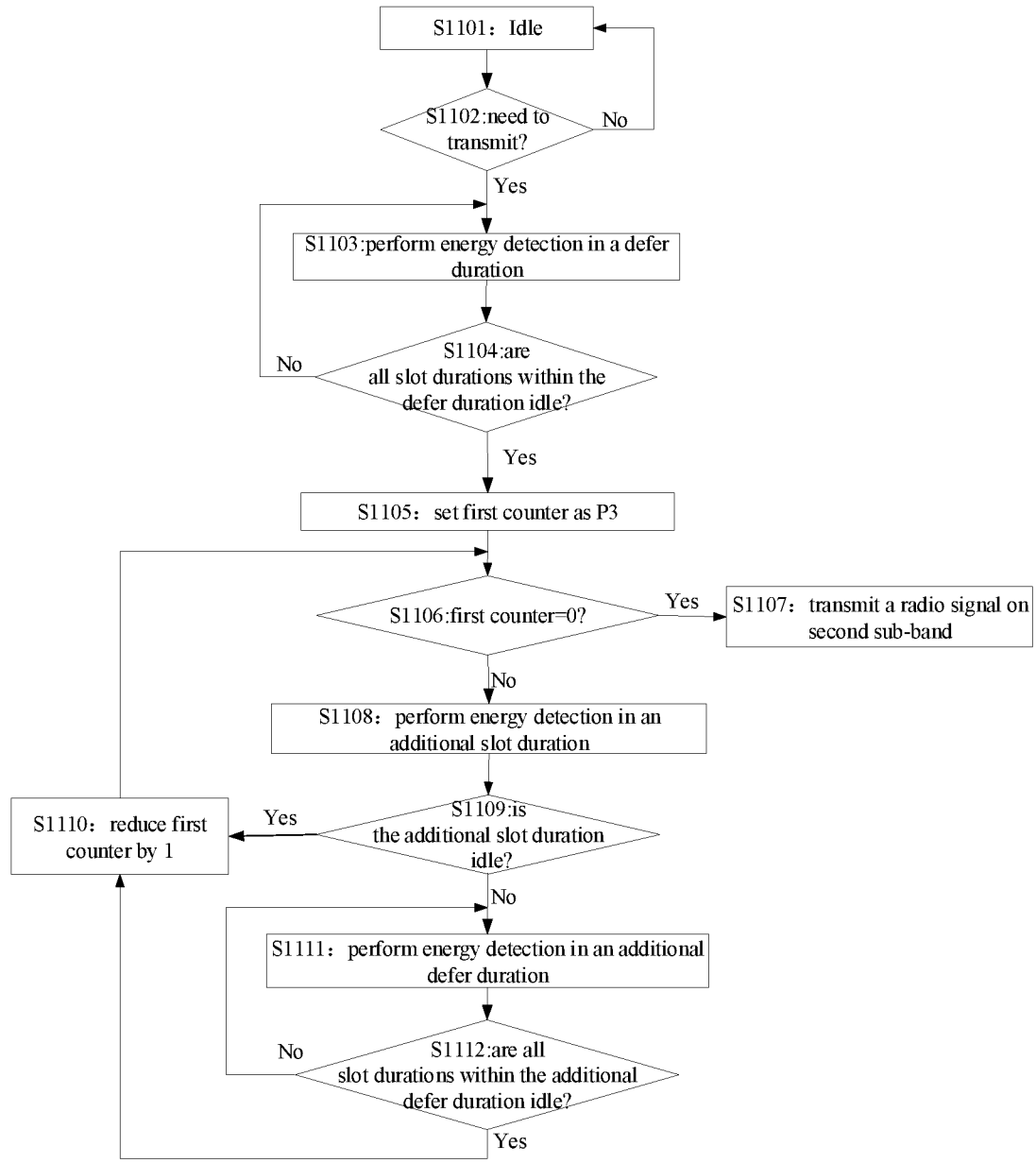
FIG. 11 illustrates a schematic diagram of P energy detection(s) according to one embodiment of the present disclosure.

Embodiment 11 illustrates a schematic diagram of P energy detection(s); as shown in FIG. 11.

In Embodiment 11, the first node of the present disclosure performs P energy detection(s) respectively in P time sub-pool(s) on the second sub-band to obtain P detection value(s). The P is the P2 of the present disclosure, and the P2 is greater than P3, wherein the P3 is a candidate integer of K2 candidate integer(s), when each of P3 detection value(s) among the P detection value(s) is lower than a third threshold, the first node transmits the second radio signal at the first instant of time on the second sub-band, otherwise the first node drops transmitting of the second radio signal at the first instant of time on the second sub-band. P3 time sub-pool(s) is(are) time sub-pool(s) respectively corresponding to the P3 detection value(s) among the P time sub-pool(s). The process of the P energy detection(s) can be depicted by the flowchart in FIG. 11.

In Embodiment 11, the first node of the present disclosure is idle in step S110, and determines whether to transmit in step S1102; performs energy detection in a defer duration on the second sub-band in step S1103; and determine in step S1104 whether all slot durations within the defer duration are idle, if yes, move towards step S1105 to set the first counter as the P3; otherwise go back to step S1104; the first node then determines whether the first counter is 0 in step S1106, if yes, move forward to step S1107 to transmit a radio signal on the second sub-band; otherwise move forward to step S1108 to perform energy detection in an additional slot duration on the second sub-band; the first node determines in step S1109 whether the additional slot duration is idle, if yes, move forward to step S1110 to reduce the first counter by 1, and go back to step S1106; otherwise move forward to step S1111 to perform energy detection in an additional defer duration on the second sub-band; and determines in step S1112 whether all slot durations within the additional defer duration are idle, if yes, move back to step S1110, otherwise go back to step S1111.

In Embodiment 11, a first given duration comprises a positive integer number of time sub-pool(s) of the P time sub-pool(s), the first given duration is any duration among all defer durations, all additional slot durations and all additional defer durations comprised in FIG. 11. A second given duration comprises one time sub-pool of the P3 time sub-pool(s), the second given duration is an additional slot duration or an additional defer duration in FIG. 11.

In one embodiment, all defer durations, all additional slot durations and all additional defer durations comprised in FIG. 11 are located before the first instant of time of the present disclosure in time domain.

In one embodiment, if a value of the first counter is yet to reach 0 by the first instant of time of the present disclosure, then the process of the P energy detection(s) illustrated by FIG. 11 is terminated.

In one embodiment, if the first counter is equal to 0 at the first instant of time of the present disclosure, then the P energy detection(s) determines(determine) that the second sub-band is idle; otherwise the P energy detection(s) determines(determine) that the second sub-band is not idle.

In one embodiment, if the first counter is equal to 0 at the first instant of time of the present disclosure, then the first node transmits the second radio signal at the first instant of time on the second sub-band, otherwise the first node drops transmitting the second radio signal at the first instant of time on the second sub-band.

In one embodiment, any slot duration within a given duration comprises one of the P time sub-pool(s); the given duration is any duration among all defer durations, all additional slot durations and all additional defer durations comprised in FIG. 11.

In one embodiment, performing energy detection in a given duration means performing energy detection in all slot durations within the given duration; the given duration is any duration among all defer durations, all additional slot durations and all additional defer durations comprised in FIG. 11.

In one embodiment, performing energy detection in a given duration means performing energy detection in time sub-pool(s) within the given duration; the given duration is any duration among all defer durations, all additional slot durations and all additional defer durations comprised in FIG. 11, each of the time sub-pool(s) belongs to the P time sub-pool(s), and energy detection(s) performed in the time sub-pool(s) is(are) energy detection(s) of the P energy detection(s) corresponding to the time sub-pool(s).

In one embodiment, the phrase that a given duration is determined as idle through energy detection means that all slot durations comprised in the given duration are determined to be idle through energy detection; the given duration is any duration among all defer durations, all additional slot durations and all additional defer durations comprised in FIG. 11.

In one embodiment, the phrase that a given duration is determined as idle through energy detection means that each of detection value(s) obtained by energy detection(s) performed in time sub-pool(s) comprised in the given duration is lower than the third threshold; the given duration is any duration among all defer durations, all additional slot durations and all additional defer durations comprised in FIG. 11, each of the time sub-pool(s) belongs to the P time sub-pool(s), and the detection value(s) is(are) detection value(s) of the P detection value(s) corresponding to the time sub-pool(s).

In one embodiment, the phrase that a given slot duration is determined as idle through energy detection means that the first node senses power of all radio signals in a given time unit on the second sub-band and averages in time, from which a received power obtained is lower than the third threshold; the given time unit is a consecutive time duration in the given slot duration.

In one subembodiment, the given time unit lasts no shorter than 4 μs.

In one embodiment, the phrase that a given slot duration is determined as idle through energy detection means that the first node senses energy of all radio signals in a given time unit on the second sub-band and averages in time, from which a received energy obtained is lower than the third threshold; the given time unit is a consecutive time duration in the given slot duration.

In one subembodiment, the given time unit lasts no shorter than 4 μs.

In one embodiment, the phrase that a given slot duration is determined as idle through energy detection means that the first node performs energy detection(s) on time sub-pool(s) comprised in the given slot duration, and each of obtained detection value(s) is lower than the third threshold; each of the time sub-pool(s) belongs to the P time sub-pool(s), and the detection value(s) is(are) detection value(s) of the P detection value(s) corresponding to the time sub-pool(s).

In one embodiment, a defer duration lasts 16 μs plus S1 time(s) of 9 μs, where S1 is a positive integer.

In one subembodiment, a defer duration comprises S1+1 time sub-pools out of the P time sub-pools.

In one embodiment, an additional defer duration lasts 16 μs plus S2 time(s) of 9 μs, where S2 is a positive integer.

In one subembodiment, an additional defer duration comprises S2+1 time sub-pools out of the Q time sub-pools.

In one embodiment, a slot duration comprises one of the P time sub-pool(s).

In one embodiment, an additional slot duration comprises one of the P time sub-pool(s).

In one embodiment, when the P is the P2, each of the P energy detection(s) is energy detection in Cat 4 LBT, and the detailed definition of the Cat 4 LBT can be found in 3GPP TR36.889.

In one embodiment, when the P is the P2, each of the P energy detection(s) is energy detection in Type 1 UL channel access procedure, and the detailed definition of the Type 1 UL channel access procedure can be found in 3GPP TS36.213, section 15.2.

In one embodiment, the K2 is one of numbers 3, 7, 15, 31, 63, 127, 255, 511, and 1023.

In one embodiment, the K2 is $CW_p$, the $CW_p$ is contention window size, and the specific meaning of the $CW_p$ can be found in 3GPP TS36.213, section 15.

In one subembodiment, the K2 is $CW_p$ in Cat 4 LBT, and the specific meaning of the Cat 4 LBT can be found in 3GPP TR36.889.

In one embodiment, the K2 candidate integer(s) is(are) respectively non-negative integers.

In one embodiment, the K2 candidate integer(s) is(are) 0, 1, 2 . . . , and K2-1.

In one embodiment, the first node selects the P3 from the K2 candidate integers at random.

In one embodiment, any of the K2 candidate integers is chosen as the P3 at equal probability.

In one embodiment, time-domain resources occupied by any of the P time sub-pool(s) are contiguous.

In one embodiment, the P time sub-pools are mutually orthogonal (that is, non-overlapped) in time domain.

In one embodiment, a time duration of any of the P time sub-pool(s) is either 16 μs or 9 μs.

In one embodiment, there are at least two time sub-pools of unequal time durations among the P time sub-pools.

In one embodiment, any two of the P time sub-pools are of equal time duration.

In one embodiment, time-domain resources occupied by the P time sub-pools are contiguous.

In one embodiment, there are at least two adjacent time sub-pools among the P time sub-pools by which time-domain resources occupied are not contiguous.

In one embodiment, any two adjacent time sub-pools of the P time sub-pools occupy time-domain resources that are not contiguous.

In one embodiment, any of the P time sub-pool(s) is a slot duration.

In one embodiment, any of the P time sub-pool(s) is a $T_{sl}$, wherein the $T_{sl}$ is a slot duration, and for the detailed definition of the $T_{sl}$, refer to 3GPP TS36.213, section 15.

In one embodiment, any of the P time sub-pools other than an earliest time sub-pool is a slot duration.

In one embodiment, any of the P time sub-pools other than an earliest time sub-pool is a $T_{sl}$, wherein the $T_{sl}$ is a slot duration, and for the detailed definition of the $T_{sl}$, refer to 3GPP TS36.213, section 15.

In one embodiment, of the P time sub-pool(s) there is at least one time sub-pool lasting 16 μs.

In one embodiment, of the P time sub-pool(s) there is at least one time sub-pool lasting 9 μs.

In one embodiment, an earliest time sub-pool of the P time sub-pools lasts 16 μs.

In one embodiment, a latest time sub-pool of the P time sub-pools lasts 9 μs.

In one embodiment, the P time sub-pool(s) comprises (comprise) listening time in Cat 4 LBT.

In one embodiment, the P time sub-pool(s) comprises (comprise) slot durations comprised in a defer duration and slot durations comprised in backoff time in Cat 4 LBT.

In one embodiment, the P time sub-pool(s) comprises (comprise) slot durations comprised in a defer duration and slot durations comprised in backoff time in Type 1 UL channel access procedure.

In one embodiment, the P time sub-pool(s) comprises (comprise) slot durations in both initial Clear Channel Assessment (CCA) and Enhanced Clear Channel Assessment (eCCA).

In one embodiment, the P detection value(s) is(are) respectively P received power(s) obtained by the first node's sensing power of all radio signals in P time unit(s) on the second sub-band and then averaging in time; the P time unit(s) is(are) P consecutive time duration(s) respectively in the P time sub-pool(s).

In one subembodiment, any of the P time unit(s) lasts no shorter than 4 μs.

In one embodiment, the P detection value(s) is(are) respectively P received energy(energies) obtained by the first node's sensing energy of all radio signals in P time unit(s) on the second sub-band and then averaging in time; the P time unit(s) is(are) P consecutive time duration(s) respectively in the P time sub-pool(s).

In one subembodiment, any of the P time unit(s) lasts no shorter than 4 μs.

In one embodiment, the P3 is a non-negative integer no greater than the P2.

In one embodiment, the P3 is a non-negative integer less than the P2.

In one embodiment, the P3 is greater than 0.

In one embodiment, the P3 is equal to 0.

In one embodiment, the P2 is greater than 1.

In one embodiment, the P2 is no less than the P3 plus 2.

In one embodiment, each of the P detection value(s) is measured by dBm.

In one embodiment, each of the P detection value(s) is measured by mW.

In one embodiment, each of the P detection value(s) is measured by J.

In one embodiment, the third threshold is measured by dBm.

In one embodiment, the third threshold is measured by mW.

In one embodiment, the third threshold is measured by J.

In one embodiment, the third threshold is equal to or less than −72 dBm.

In one embodiment, the third threshold is any value equal to or less than a third given value.

In one subembodiment, the third given value is predefined.

In one subembodiment, the third given value is configured by a higher-layer signaling, and the first node is a UE.

In one embodiment, the third threshold is selected liberally by the first node given that the third threshold is equal to or less than a third given value.

In one subembodiment, the third given value is predefined.

In one subembodiment, the third given value is configured by a higher-layer signaling, and the first node is a UE.

In one embodiment, of detection value(s) not belonging to the P3 detection value(s) among the P detection values, at least one detection value is lower than the third threshold.

In one embodiment, each of the P detection value(s) is lower than the third threshold.

In one embodiment, of detection value(s) not belonging to the P3 detection value(s) among the P detection values, there is at least one detection value not lower than the third threshold.

In one embodiment, the P3 time sub-pool(s) only comprises(comprise) slot durations in eCCA.

In one embodiment, a third given duration comprises one of the P3 time sub-pool(s), and the third given duration is any one additional slot duration in FIG. 11.

In one embodiment, the P time sub-pools comprise the P3 time sub-pool(s) and P4 time sub-pool(s), and any of the P4 time sub-pool(s) is not one of the P3 time sub-pool(s); P4 is a positive integer no greater than the P minus the P3.

In one subembodiment, the P4 is equal to the P minus the P3.

In one subembodiment, the P4 time sub-pool(s) comprises (comprise) slot durations in initial CCA.

In one subembodiment, positions of the P4 time sub-pools among the P time sub-pools are consecutive.

In one subembodiment, the P4 time sub-pool(s) comprises (comprise) all slot durations within all defer durations in FIG. 11.

In one subembodiment, the P4 time sub-pool(s) comprises (comprise) slot durations within at least one of additional defer durations in FIG. 11.

In one subembodiment, the P4 time sub-pool(s) comprises (comprise) at least one of additional slot durations in FIG. 11.

In one embodiment, the P3 time sub-pool(s) respectively belongs(belong) to P3 sub-pool set(s), any of the P3 sub-pool set(s) comprises a positive integer number of time sub-pool(s) of the P time sub-pool(s); and a detection value corresponding to any time sub-pool in the P3 sub-pool set(s) is lower than the first threshold.

In one subembodiment, at least one of the P3 sub-pool set(s) comprises one time sub-pool.

In one subembodiment, at least one of the P3 sub-pool set(s) comprises more than one time sub-pool.

In one subembodiment, at least two of the P3 sub-pool sets comprise unequal numbers of time sub-pools.

In one subembodiment, none of the P sub-pools belongs to two of the P3 sub-pool sets simultaneously.

EMBODIMENT 12

Figure 12:
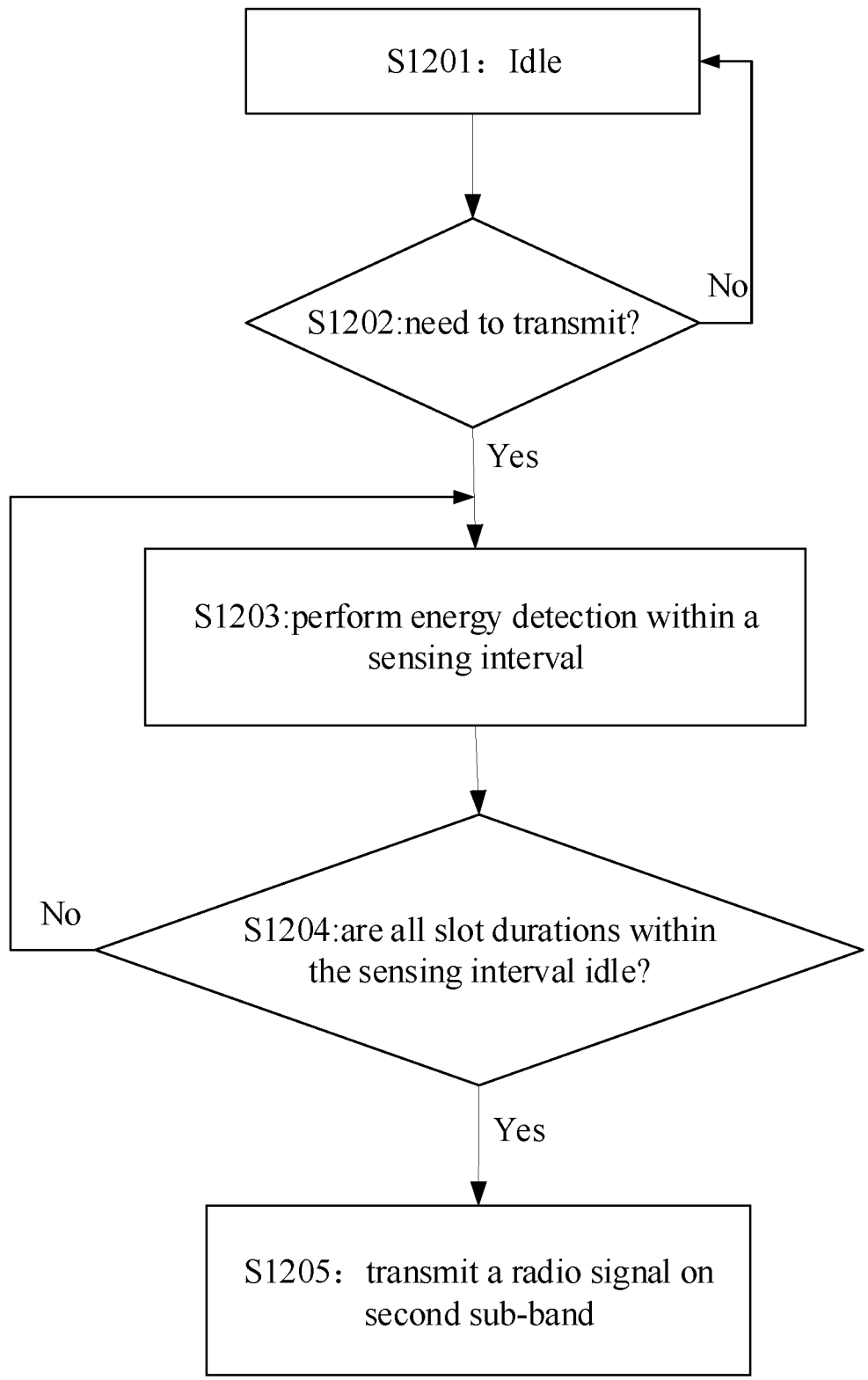
FIG. 12 illustrates a schematic diagram of P energy detection(s) according to one embodiment of the present disclosure.

Embodiment 12 illustrates a schematic diagram of P energy detection(s); as shown in FIG. 12.

In Embodiment 12, the first node of the present disclosure performs P energy detection(s) respectively in P time sub-pool(s) on the second sub-band to obtain P detection value(s). The P is the P1 of the present disclosure, and the P1 is a fixed value. The P detection value(s) is(are) used by the first node for determining whether to transmit a second radio signal at a first instant of time on the second sub-band. When each of the P detection value(s) is lower than a second threshold, the first node transmits the second radio signal at the first instant of time on the second sub-band, otherwise the first node drops transmitting of the second radio signal at the first instant of time on the second sub-band. The process of the P energy detection(s) can be depicted by the flowchart in FIG. 12.

In Embodiment 12, the first node of the present disclosure is idle in step S1201, and determine in step S1202 whether there is need to transmit; performs energy detection in a sensing interval in step S1203; and determines in step S1204 whether all slot durations within the sensing interval are idle, if yes, move forward to step S1205 to transmit a radio signal on the second sub-band; otherwise go back to step S1203.

In Embodiment 12, any sensing interval among all sensing intervals comprised in FIG. 12 comprises a positive integer number of time sub-pool(s) of the P time sub-pool(s).

In one embodiment, any slot duration in any sensing interval comprised in FIG. 12 comprises one of the P time sub-pool(s).

In one embodiment, all sensing intervals comprised in FIG. 12 are located before the first instant of time of the present disclosure in time domain.

In one embodiment, if not all slot durations are idle within a sensing interval located before the first instant of time of the present disclosure in time domain and adjacent to the first instant of time, then the process of the P energy detection(s) illustrated by FIG. 12 will be terminated.

In one embodiment, if all slot durations are idle within a sensing interval located before the first instant of time of the present disclosure in time domain and adjacent to the first instant of time, then it is determined by the P energy detection(s) that the second sub-band is idle; otherwise it is determine by the P energy detection(s) that the second sub-band is not idle.

In one embodiment, if all slot durations are idle within a sensing interval located before the first instant of time of the present disclosure in time domain and adjacent to the first instant of time, then the first node transmits the second radio signal at the first instant of time on the second sub-band, otherwise the first node drops transmitting the second radio signal at the first instant of time on the second sub-band.

In one embodiment, a sensing interval lasts 25 µs.

In one embodiment, a sensing interval comprises 2 slot durations, and the 2 slot durations are non-consecutive in time domain.

In one subembodiment, a time interval between the 2 slot durations is 7 µs.

In one embodiment, the P1 is equal to 2.

In one embodiment, the P1 is a number by default (i.e. no need of configuration).

In one embodiment, the P1 is pre-defined.

In one embodiment, the P1 is pre-configured.

In one embodiment, when the P is the P1, each of the P energy detection(s) is energy detection in Cat 2 LBT, and the detailed definition of the Cat 2 LBT can be found in 3GPP TR36.889.

In one embodiment, when the P is the P1, each of the P energy detection(s) is energy detection in Type 2 UL channel access procedure, and the detailed definition of the Type 2 UL channel access procedure can be found in 3GPP TS36.213, section 15.2.

In one embodiment, the P time sub-pool(s) comprises (comprise) listening time in Cat 2 LBT.

In one embodiment, the P time sub-pool(s) comprises (comprise) slot durations comprised in a sensing interval in Type 2 UL channel access procedure, and the detailed definition of the sensing interval can be found in 3GPP TS36.213, section 15.2.

In one subembodiment, the sensing interval lasts 25 µs.

In one embodiment, the P time sub-pool(s) comprises (comprise) $T_f$ and $T_{sl}$ comprised in a sensing interval in Type 2 UL channel access procedure, where the $T_f$ and the $T_{sl}$ are two time intervals, and the specific meaning of the $T_f$ and the $T_{sl}$ can be found in 3GPP TS36.213, section 15.2.

In one subembodiment, the $T_f$ lasts 16 µs.

In one subembodiment, the $T_{sl}$ lasts 9 µs.

In one embodiment, a first time sub-pool among the P time sub-pools lasts 16 µs, and a second time sub-pool among the P time sub-pools lasts 9 µs, P being equal to 2.

In one embodiment, each of the P time sub-pools lasts 9 µs; and a time interval between a first time sub-pool and a second time sub-pool among the P time sub-pools is 7 µs, P being equal to 2.

In one embodiment, each of the P detection value(s) is measured by dBm.

In one embodiment, each of the P detection value(s) is measured by mW.

In one embodiment, each of the P detection value(s) is measured by J.

In one embodiment, the second threshold is measured by dBm.

In one embodiment, the second threshold is measured by mW.

In one embodiment, the second threshold is measured by J.

In one embodiment, the second threshold is equal to or less than −72 dBm.

In one embodiment, the second threshold is any value equal to or less than a second given value.

In one subembodiment, the second given value is pre-defined.

In one subembodiment, the second given value is configured by a higher-layer signaling, and the first node is a UE.

In one embodiment, the second threshold is selected liberally by the first node given that the second threshold is equal to or less than a second given value.

In one subembodiment, the second given value is pre-defined.

In one subembodiment, the second given value is configured by a higher-layer signaling, and the first node is a UE.

EMBODIMENT 13

Figure 13:
FIG. 13 illustrates a schematic diagram of a given energy detection being associated with a given antenna port group according to one embodiment of the present disclosure.
Figure 13:
Figure 13:
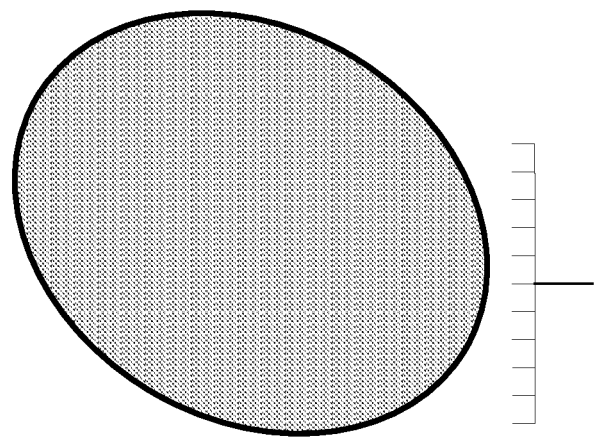

Embodiment 13 illustrates a schematic diagram of a given energy detection being associated with a given antenna port group; as shown in FIG. 13. The given energy detection is one of the Q energy detection(s) in the present disclosure, and the given antenna port group is the first antenna port group in the present disclosure; or the given energy detection is one of the P energy detection(s) in the present disclosure, and the given antenna port group is the first antenna port group in the present disclosure; or the given energy detection is one of the P energy detection(s) in the present disclosure, and the given antenna port group is the second antenna port group in the present disclosure.

In FIG. 13, an ellipsis framed with thick solid curves represents a set of spatial coverage(s) of a transmitting beam(s) corresponding to (all) antenna port(s) comprised in the given antenna port group, while an ellipsis filled with dots represents a spatial coverage of a receiving beam corresponding to the given energy detection.

In one embodiment, the phrase that the given energy detection is associated with the given antenna port group means that a set of spatial coverage(s) of a transmitting beam(s) corresponding to (all) antenna port(s) comprised in the given antenna port group is overlapping with a spatial coverage of a receiving beam corresponding to the given energy detection.

In one embodiment, the phrase that the given energy detection is associated with the given antenna port group means that a beamforming vector corresponding to antenna port(s) in the given antenna port group is used as a reception beamforming vector employed in the given energy detection.

In one embodiment, the phrase that the given energy detection is associated with the given antenna port group means that an analog beamforming matrix corresponding to antenna port(s) in the given antenna port group is used as a reception analog beamforming matrix employed in the given energy detection.

In one embodiment, the phrase that the given energy detection is associated with the given antenna port group means that a transmitting spatial filtering corresponding to antenna port(s) in the given antenna port group is used as a receiving spatial filtering employed in the given energy detection.

In one embodiment, the phrase that the given energy detection is associated with the given antenna port group means that the first node of the present disclosure monitors a received power or received energy in the given energy detection, using a beamforming vector that corresponds to antenna port(s) in the given antenna port group.

In one embodiment, the phrase that the given energy detection is associated with the given antenna port group means that the first node of the present disclosure senses power or energy of all radio signals in the given energy detection, using a beamforming vector that corresponds to antenna port(s) in the given antenna port group.

In one embodiment, the phrase that the given energy detection is associated with the given antenna port group means that the first node of the present disclosure monitors a received power or received energy in the given energy detection, using an analog beamforming matrix that corresponds to antenna port(s) in the given antenna port group.

In one embodiment, the phrase that the given energy detection is associated with the given antenna port group means that the first node of the present disclosure senses power or energy of all radio signals in the given energy detection, using an analog beamforming matrix that corresponds to antenna port(s) in the given antenna port group.

In one embodiment, the phrase that the given energy detection is associated with the given antenna port group means that the first node of the present disclosure monitors a received power or received energy in the given energy detection, using spatial filtering that corresponds to antenna port(s) in the given antenna port group.

In one embodiment, the phrase that the given energy detection is associated with the given antenna port group means that the first node of the present disclosure senses power or energy of all radio signals in the given energy detection, using spatial filtering that corresponds to antenna port(s) in the given antenna port group.

EMBODIMENT 14

Figure 14:
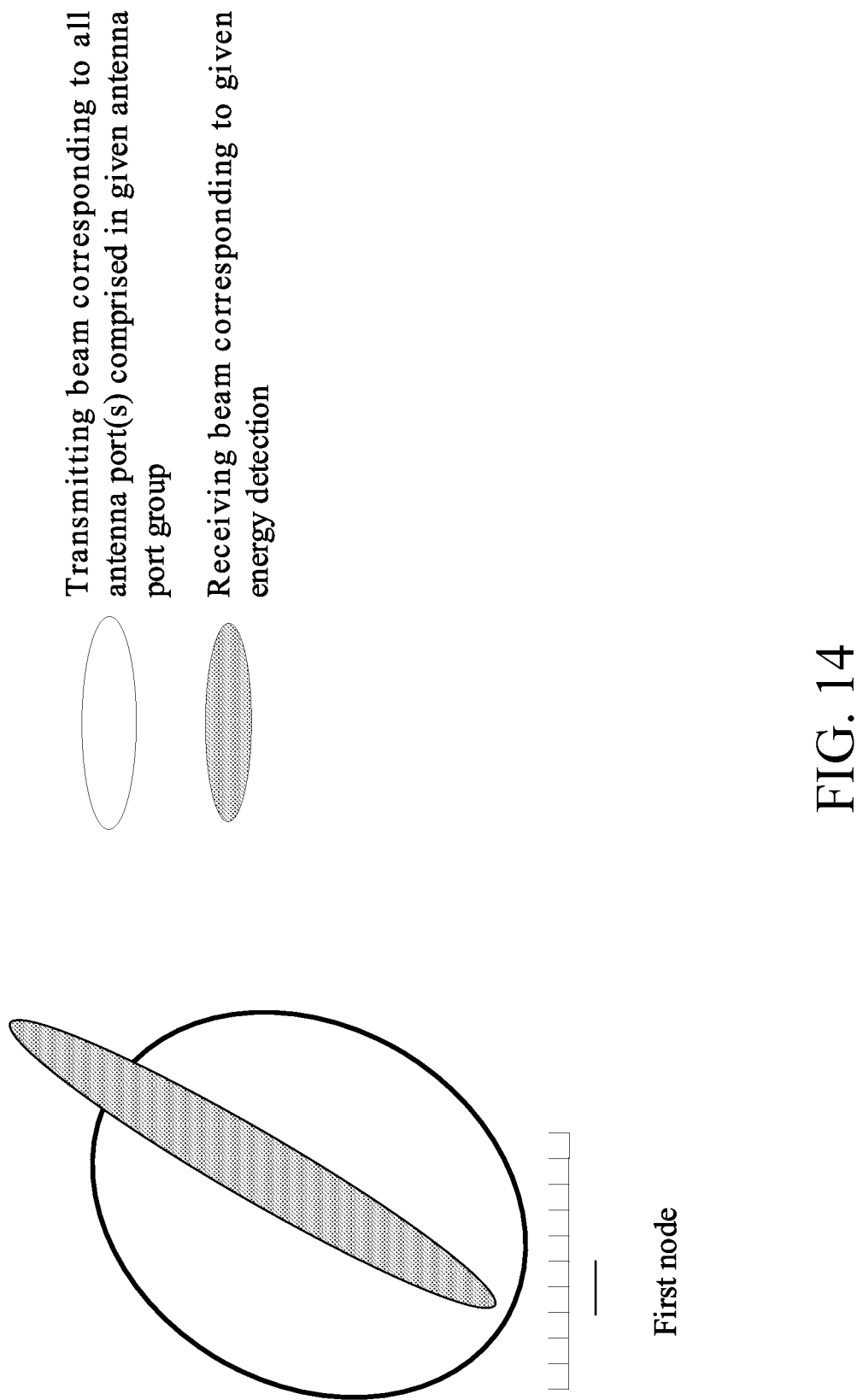
FIG. 14 illustrates a schematic diagram of a given energy detection being associated with a given antenna port group according to one embodiment of the present disclosure.

Embodiment 14 illustrates a schematic diagram of a given energy detection being associated with a given antenna port group; as shown in FIG. 14. The energy detection is one of the Q energy detection(s) in the present disclosure, and the given antenna port group is the first antenna port group in the present disclosure; or the given energy detection is one of the P energy detection(s) in the present disclosure, and the given antenna port group is the first antenna port group in the present disclosure; or the given energy detection is one of the P energy detection(s) in the present disclosure, and the given antenna port group is the second antenna port group in the present disclosure.

In FIG. 14, an ellipsis framed with thick solid curves represents a set of spatial coverage(s) of a transmitting beam(s) corresponding to (all) antenna port(s) comprised in the given antenna port group, while an ellipsis filled with dots represents a spatial coverage of a receiving beam corresponding to the given energy detection.

In one embodiment, the phrase that the given energy detection is associated with the given antenna port group means that a spatial coverage of a receiving beam corresponding to the given energy detection is located within a set of spatial coverage(s) of a transmitting beam(s) corresponding to (all) antenna port(s) comprised in the given antenna port group.

EMBODIMENT 15

Figure 15:
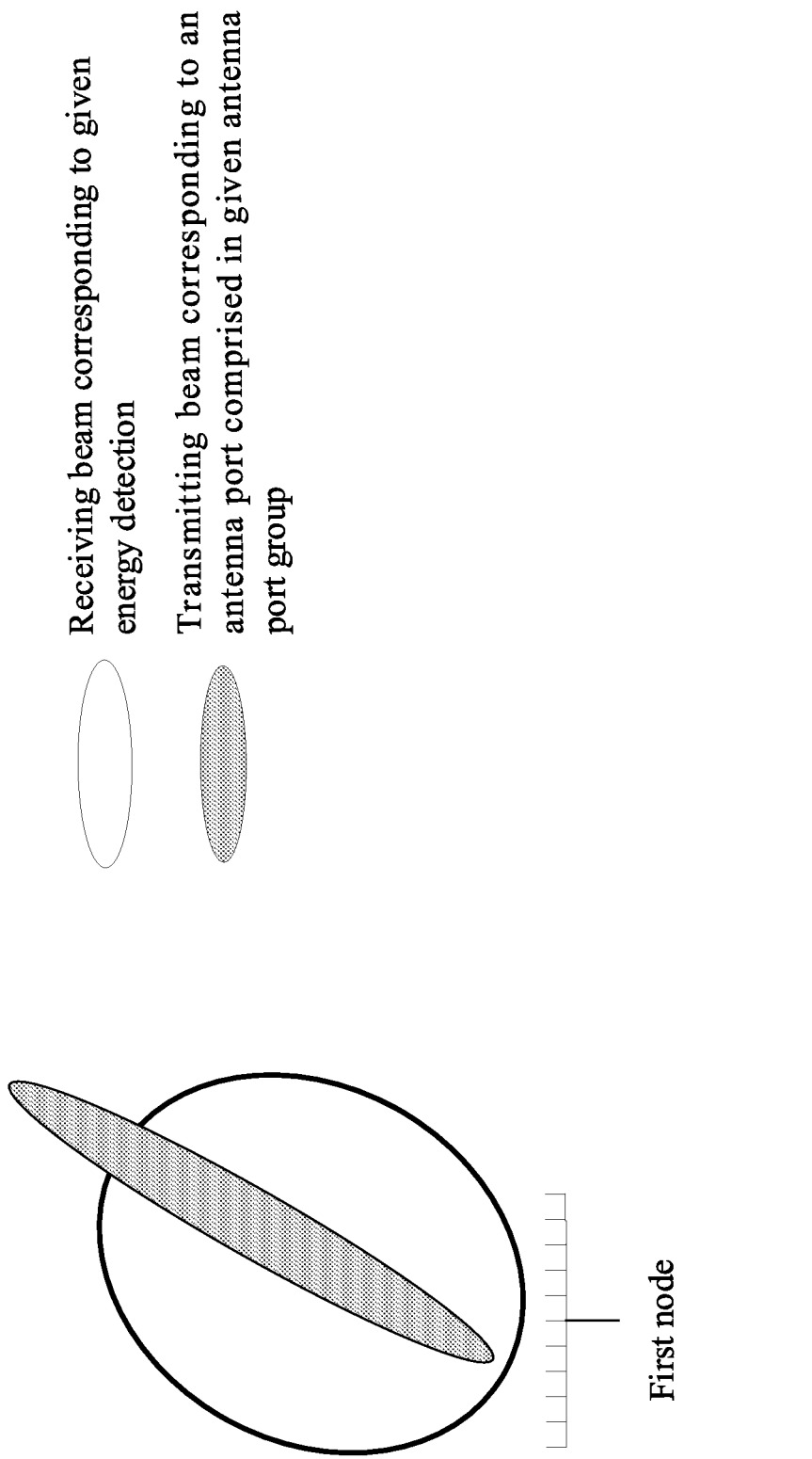
FIG. 15 illustrates a schematic diagram of a given energy detection being associated with a given antenna port group according to one embodiment of the present disclosure.

Embodiment 15 illustrates a schematic diagram of a given energy detection being associated with a given antenna port group; as shown in FIG. 15. The energy detection is one of the Q energy detection(s) in the present disclosure, and the given antenna port group is the first antenna port group in the present disclosure; or the given energy detection is one of the P energy detection(s) in the present disclosure, and the given antenna port group is the first antenna port group in the present disclosure; or the given energy detection is one of the P energy detection(s) in the present disclosure, and the given antenna port group is the second antenna port group in the present disclosure.

In FIG. 15, an ellipsis framed with thick solid curves represents a set of spatial coverage(s) of a transmitting beam(s) corresponding to (all) antenna port(s) comprised in the given antenna port group, while an ellipsis filled with dots represents a spatial coverage of a receiving beam corresponding to the given energy detection.

In one embodiment, the phrase that the given energy detection is associated with the given antenna port group means that a spatial coverage of a transmitting beam corresponding to any antenna port in the given antenna port group is within a spatial coverage of a receiving beam corresponding to the given energy detection.

EMBODIMENT 16

Figure 16:
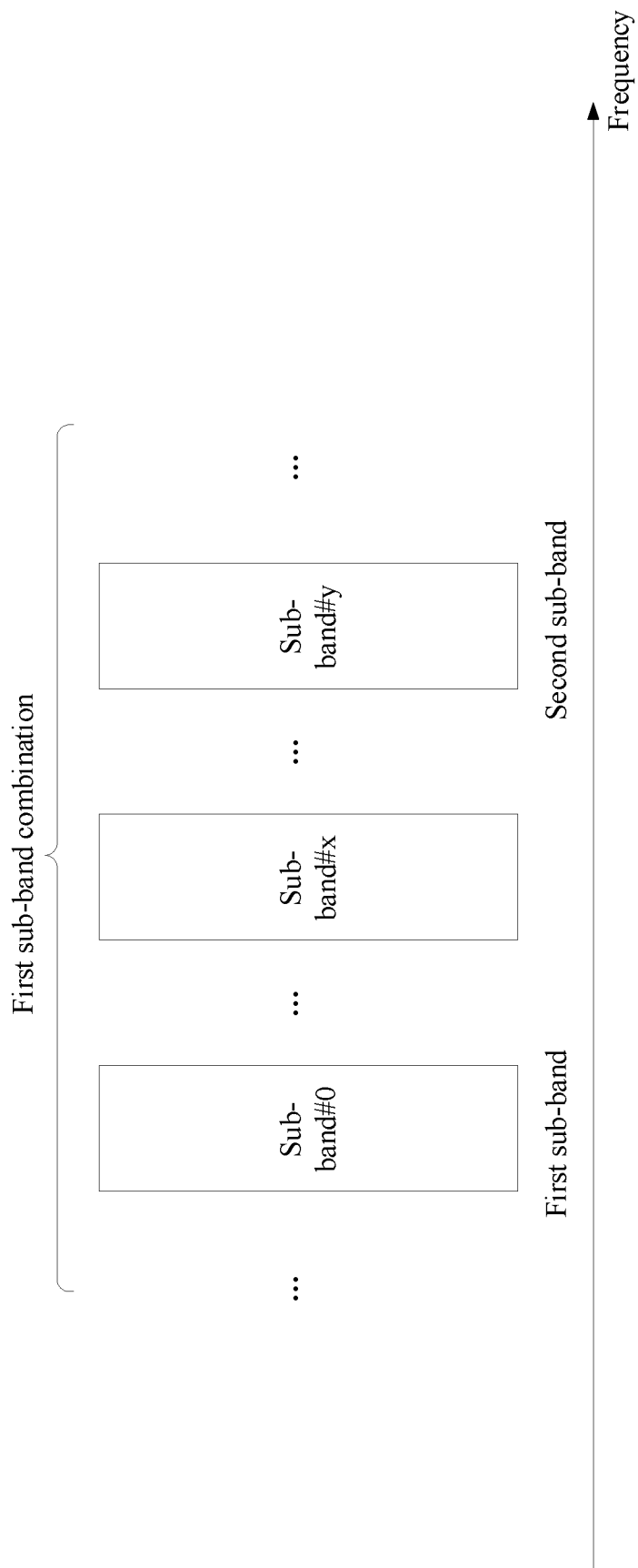
FIG. 16 illustrates a schematic diagram of a first sub-band combination according to one embodiment of the present disclosure.

Embodiment 16 illustrates a schematic diagram of a first sub-band combination; as shown in FIG. 16.

In Embodiment 16, the first sub-band combination comprises a positive integer number of sub-bands. The first sub-band of the present disclosure and the second sub-band of the present disclosure both belong the first sub-band combination. In FIG. 16, indexes of the positive integer number of sub-bands are #0 . . . , #x . . . , #y . . . , respectively. Herein, x and y are respectively positive integers and the y is greater than the x.

In one embodiment, carrier frequencies of all sub-bands in the first sub-band combination form a subset of a carrier frequency set, for the detailed definition of the carrier frequency set, refer to 3GPP TS36.104, section 5.7.4.

In one embodiment, the first sub-band combination is composed of the first sub-band and the second sub-band.

In one embodiment, the first sub-band combination comprises sub-band(s) other than the first sub-band and the second sub-band.

In one embodiment, the first sub-band combination forms a carrier and the positive integer number of sub-bands are a positive integer number of BWPs in the carrier.

In one embodiment, any sub-band among the positive integer number of sub-bands is a carrier.

In one embodiment, the first sub-band combination belongs to a given carrier, and the given carrier corresponds to a serving cell.

In one embodiment, the positive integer number of sub-bands correspond to one serving cell.

In one embodiment, there is a Guard Period between any two adjacent sub-bands comprised by the first sub-band combination in frequency domain.

EMBODIMENT 17

Figure 17:
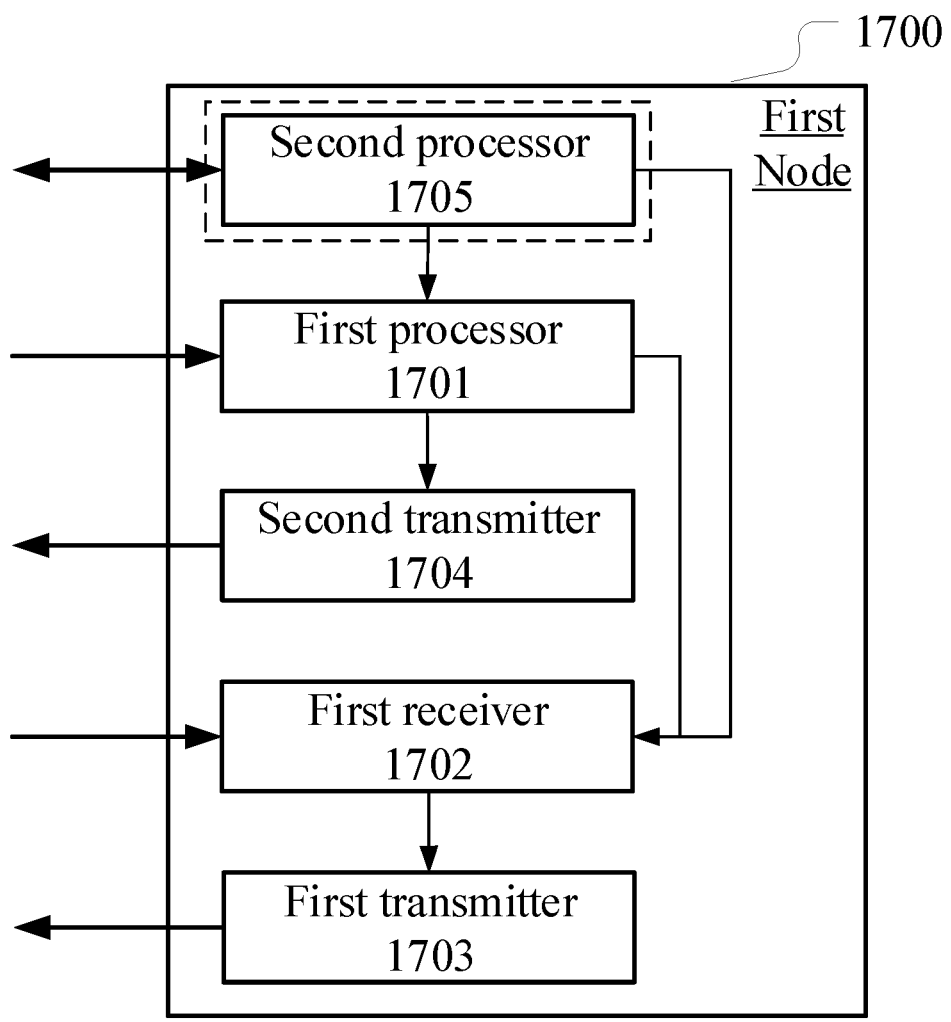
FIG. 17 illustrates a structure block diagram of a processing device in a first node according to one embodiment of the present disclosure.

Embodiment 17 illustrates a structure block diagram of a processing device in a first node; as shown in FIG. 17. In FIG. 17, a processing device 1700 in a first node is mainly comprised of a first processor 1701, a first receiver 1702, a first transmitter 1703, a second transmitter 1704 and a second processor 1705. In FIG. 17, the square framed with dotted lines is optional.

In Embodiment 17, the first processor 1701 performs Q energy detection(s) respectively in Q time sub-pool(s) on a first sub-band to obtain Q detection value(s), and determines only based on the Q detection value(s) that a first radio signal is transmitted at a first instant of time on the first sub-band; the first receiver 1702 performs P energy detection(s) respectively in P time sub-pool(s) on a second sub-band to obtain P detection value(s); the first transmitter 1703 transmits a second radio signal at the first instant of time on the second sub-band, or, drops transmitting the second radio signal at the first instant of time on the second sub-band; the second transmitter 1704 transmits the first radio signal at the first instant of time on the first sub-band; and the second processor 1705 operates at least one of a first signaling or a second signaling.

In Embodiment 17, the P detection value(s) is(are) used by the first transmitter 1703 to determine whether the second radio signal is transmitted at the first instant of time on the second sub-band; and each of the Q energy detection(s) is associated with a first antenna port group; when each of the P energy detection(s) is associated with the first antenna port group, P is P1; when one of the P energy detection(s) is not associated with the first antenna port group, the P is P2; the Q is a positive integer; the P1 and the P2 are unequal positive integers; an antenna port group comprises a positive integer number of antenna port(s); the first node is a base station, or the first node is a UE. The first signaling and the second signaling respectively comprise scheduling information of the first radio signal and scheduling information of the second radio signal; the operating is transmitting, and the first node is a base station; or the operating is receiving, and the first node is a UE.

In one embodiment, the P is the P1, and the P1 is a fixed value; when each of the P detection value(s) is lower than a second threshold, the first transmitter 1703 transmits the second radio signal at the first instant of time on the second sub-band, otherwise the first transmitter 1703 drops transmitting of the second radio signal at the first instant of time on the second sub-band.

In one embodiment, the P is the P2, and the P2 is greater than P3, wherein the P3 is a candidate integer of K2 candidate integer(s); when each of P3 detection value(s) among the P detection value(s) is lower than a third threshold, the first transmitter 1703 transmits the second radio signal at the first instant of time on the second sub-band, otherwise the first transmitter 1703 drops transmitting of the second radio signal at the first instant of time on the second sub-band; the K2 being a positive integer.

In one embodiment, at least one transmission antenna port of the first radio signal is QCL with an antenna port in the first antenna port group; at least one transmission antenna port of the second radio signal is QCL with an antenna port in a second antenna port group, and each of the P energy detection(s) is associated with the second antenna port group.

In one embodiment, the Q detection value(s) is(are) used by the second transmitter 1704 to determine that the first radio signal is transmitted at the first instant of time on the first sub-band; each of Q3 detection value(s) among the Q detection value(s) is lower than a first threshold, wherein Q3 is a candidate integer of K1 candidate integer(s), and K1 is a positive integer.

In one embodiment, the second processor 1705 also receives first information; herein, the first node is a UE; the first information is used to determine a first sub-band combination, and the first sub-band combination comprises a positive integer number of sub-bands, wherein the first sub-band and the second sub-band both belong to the first sub-band combination.

In one embodiment, the first processor 1701 comprises at least one of the antenna 452, the receiver 454, the receiving processor 456, the multi-antenna receiving processor 458 or the controller/processor 459 in Embodiment 4, and the first node is a UE.

In one embodiment, the first processor 1701 comprises at least one of the antenna 420, the receiver 418, the receiving processor 470, the multi-antenna receiving processor 472 or the controller/processor 475 in Embodiment 4, and the first node is a base station.

In one embodiment, the first receiver 1702 comprises at least one of the antenna 452, the receiver 454, the receiving processor 456, the multi-antenna receiving processor 458 or the controller/processor 459 in Embodiment 4, and the first node is a UE.

In one embodiment, the first receiver 1702 comprises at least one of the antenna 420, the receiver 418, the receiving processor 470, the multi-antenna receiving processor 472 or the controller/processor 475 in Embodiment 4, and the first node is a base station.

In one embodiment, the first transmitter 1703 comprises at least one of the antenna 452, the transmitter 454, the transmitting processor 468, the multi-antenna transmitting processor 457, the controller/processor 459, the memory 460 or the data source 467 in Embodiment 4, and the first node is a UE.

In one embodiment, the first transmitter 1703 comprises at least one of the antenna 420, the transmitter 418, the transmitting processor 416, the multi-antenna transmitting processor 471, the controller/processor 459 or the memory 476 in Embodiment 4, and the first node is a base station.

In one embodiment, the second transmitter 1704 comprises at least one of the antenna 452, the transmitter 454, the transmitting processor 468, the multi-antenna transmitting processor 457, the controller/processor 459, the memory 460 or the data source 467 in Embodiment 4, and the first node is a UE.

In one embodiment, the second transmitter 1704 comprises at least one of the antenna 420, the transmitter 418, the transmitting processor 416, the multi-antenna transmitting processor 471, the controller/processor 459 or the memory 476 in Embodiment 4, and the first node is a base station.

In one embodiment, the second processor 1705 comprises at least one of the antenna 452, the receiver 454, the receiving processor 456, the multi-antenna receiving processor 458, the controller/processor 459, the memory 460 or the data source 467 in Embodiment 4, and the first node is a UE.

In one embodiment, the second processor 1705 comprises at least one of the antenna 420, the transmitter 418, the transmitting processor 416, the multi-antenna transmitting processor 471, the controller/processor 475 or the memory 476 in Embodiment 4, and the first node is a base station.

EMBODIMENT 18

Figure 18:
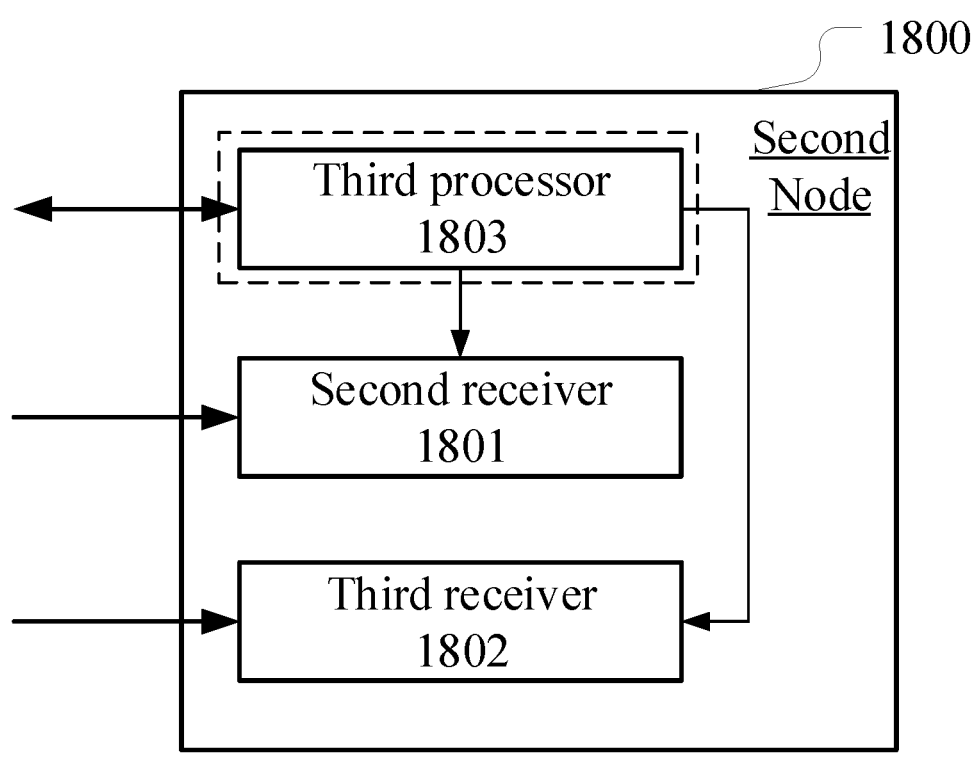
FIG. 18 illustrates a structure block diagram of a processing device in a second node according to one embodiment of the present disclosure.

Embodiment 18 illustrates a structure block diagram of a processing device in a second node, as shown in FIG. 18. In FIG. 18, a processing device 1800 in a second node is mainly comprised of a second receiver 1801, a third receiver 1802 and a third processor 1803. In FIG. 18, the square framed with dotted lines is optional.

In Embodiment 18, the second receiver 1801 receives a first radio signal at a first instant of time on a first sub-band; the third receiver 1802 monitors a second radio signal at the first instant of time on a second sub-band; and the third processor 1803 processes at least one of a first signaling or a second signaling.

In Embodiment 18, Q detection value(s) is(are) used to determine that the first radio signal is transmitted at the first instant of time on the first sub-band, and the Q detection value(s) is(are) respectively obtained by Q energy detection(s), the Q energy detection(s) respectively being performed in Q time sub-pool(s) on the first sub-band; P detection value(s) is(are) used to determine whether the second radio signal is transmitted at the first instant of time on the second sub-band, and the P detection value(s) is(are) respectively obtained by P energy detection(s), the P energy detection(s) respectively being performed in P time sub-pool(s) on the second sub-band; each of the Q energy detection(s) is associated with a first antenna port group; when each of the P energy detection(s) is associated with the first antenna port group, P is P1; when one of the P energy detection(s) is not associated with the first antenna port group, the P is P2; the P1 and the P2 are unequal positive integers; Q is a positive integer; an antenna port group comprises a positive integer number of antenna port(s); the second node is a UE, or the second node is a base station. The first signaling and the second signaling respectively comprise scheduling information of the first radio signal and scheduling information of the second radio signal; the processing is receiving and the second node is a UE; or the processing is transmitting and the second node is a base station.

In one embodiment, each of Q3 detection value(s) among the Q detection value(s) is lower than a first threshold, wherein Q3 is a candidate integer of K1 candidate integer(s), and K1 is a positive integer.

In one embodiment, the P is the P1, and the P1 is a fixed value; when each of the P detection value(s) is lower than a second threshold, then the second radio signal is transmitted at the first instant of time on the second sub-band, otherwise the second radio signal is not transmitted at the first instant of time on the second sub-band.

In one embodiment, the P is the P2, and the P2 is greater than P3, wherein the P3 is a candidate integer of K2 candidate integer(s), when each of P3 detection value(s) among the P detection value(s) is lower than a third threshold, the second radio signal is transmitted at the first instant of time on the second sub-band, otherwise the second radio signal is not transmitted at the first instant of time on the second sub-band; the K2 being a positive integer.

In one embodiment, at least one transmission antenna port of the first radio signal is QCL with an antenna port in the first antenna port group; at least one transmission antenna port of the second radio signal is QCL with an antenna port in a second antenna port group, and each of the P energy detection(s) is associated with the second antenna port group.

In one embodiment, the third processor 1803 transmits first information; herein, the second node is a base station; the first information is used to determine a first sub-band combination, the first sub-band combination comprises a positive integer number of sub-bands, and the first sub-band and the second sub-band both belong to the first sub-band combination.

In one embodiment, the second receiver 1801 comprises at least one of the antenna 452, the receiver 454, the receiving processor 456, the multi-antenna receiving processor 458, the controller/processor 459, the memory 460 or the data source 467 in Embodiment 4, and the second node is a UE.

In one embodiment, the second receiver 1801 comprises at least one of the antenna 420, the receiver 418, the receiving processor 470, the multi-antenna receiving processor 472, the controller/processor 475 or the memory 476 in Embodiment 4, and the second node is a base station.

In one embodiment, the third receiver 1802 comprises at least one of the antenna 452, the receiver 454, the receiving processor 456, the multi-antenna receiving processor 458, the controller/processor 459, the memory 460 or the data source 467 in Embodiment 4, and the second node is a UE.

In one embodiment, the third receiver 1802 comprises at least one of the antenna 420, the receiver 418, the receiving processor 470, the multi-antenna receiving processor 472, the controller/processor 475 or the memory 476 in Embodiment 4, and the second node is a base station.

In one embodiment, the third processer 1803 comprises at least one of the antenna 452, the receiver 454, the receiving processor 456, the multi-antenna receiving processor 458, the controller/processor 459, the memory 460 or the data source 467 in Embodiment 4, and the second node is a UE.

In one embodiment, the third processer 1803 comprises at least one of the antenna 420, the transmitter 418, the transmitting processor 416, the multi-antenna transmitting processor 471, the controller/processor 475 or the memory 476 in Embodiment 4, and the second node is a base station.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal includes but is not limited to unmanned aerial vehicles, communication modules on unmanned aerial vehicles, telecontrolled aircrafts, aircrafts, airplanes, mobile phones, tablet computers, notebooks, vehicle-mounted equipment, wireless sensor, IOT terminals, RFID terminals, NB-IOT terminals, Machine Type Communication (MTC) equipment, enhanced MTC (eMTC) equipment, data cards, network cards, low-cost phones, low-cost tablet computers, etc. The base station or system equipment in the present disclosure includes but is not limited to macro-cellular base stations, micro-cellular base stations, home base stations, relay base station, gNB (NR Node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communications, comprising:
    performing Q energy detection(s) respectively in Q time sub-pool(s) on a first sub-band to obtain Q detection value(s); and determining only based on the Q detection value(s) that a first radio signal is transmitted at a first instant of time on the first sub-band;
    performing P energy detection(s) respectively in P time sub-pool(s) on a second sub-band to obtain P detection value(s); and
    transmitting a second radio signal at the first instant of time on the second sub-band, or, dropping transmitting the second radio signal at the first instant of time on the second sub-band;
    wherein Q is a positive integer; the P detection value(s) is(are) used to determine whether the second radio signal is transmitted at the first instant of time on the second sub-band; and each of the Q energy detection(s) is associated with a first antenna port group; a spatial coverage of a transmitting beam corresponding to any antenna port in the first antenna port group is located within a spatial coverage of a receiving beam corresponding to any of the Q energy detection(s); when each of the P energy detection(s) is associated with the first antenna port group, P is P1; when one of the P energy detection(s) is not associated with the first antenna port group, the P is P2; the P1 and the P2 are unequal positive integers; an antenna port group comprises a positive integer number of antenna port(s); the first node is a base station, or the first node is a UE.

2. The method according to claim 1, comprising:
    transmitting the first radio signal at the first instant of time on the first sub-band, herein, the Q detection value(s) is(are) used to determine that the first radio signal is transmitted at the first instant of time on the first sub-band, and each of Q3 detection value(s) among the Q detection value(s) is lower than a first threshold, wherein Q3 is a candidate integer of K1 candidate integer(s), and K1 is a positive integer.

3. The method according to claim 1, wherein the P is the P1, and the P1 is a fixed value, when each of the P detection value(s) is lower than a second threshold, the second radio signal is transmitted at the first instant of time on the second sub-band, otherwise transmitting of the second radio signal at the first instant of time on the second sub-band is dropped; or, the P is the P2, and the P2 is greater than P3, wherein the P3 is a candidate integer of K2 candidate integer(s), when each of P3 detection value(s) among the P detection value(s) is lower than a third threshold, the second radio signal is transmitted at the first instant of time on the second sub-band, otherwise transmitting of the second radio signal at the first instant of time on the second sub-band is dropped, the K2 being a positive integer.

4. The method according to claim 1, comprising:
    operating at least one of a first signaling or a second signaling;
    wherein the first signaling and the second signaling respectively comprise scheduling information of the first radio signal and scheduling information of the second radio signal; the operating is transmitting, and the first node is a base station; or the operating is receiving, and the first node is a UE.

5. The method according to claim 1, wherein any transmission antenna port of the first radio signal is Quasi Co-Located with an antenna port in the first antenna port group; any transmission antenna port of the second radio signal is Quasi Co-Located with an antenna port in a second antenna port group, and each of the P energy detection(s) is associated with the second antenna port group.

6. A method in a second node for wireless communications, comprising:
    receiving a first radio signal at a first instant of time on a first sub-band; and
    monitoring a second radio signal at the first instant of time on a second sub-band;
    wherein Q detection value(s) is(are) used to determine that the first radio signal is transmitted at the first instant of time on the first sub-band, the Q detection value(s) is(are) respectively obtained through Q energy detection(s), and the Q energy detection(s) is(are) respectively performed in Q time sub-pool(s) on the first sub-band; P detection value(s) is(are) used to determine whether the second radio signal is transmitted at the first instant of time on the second sub-band, the P detection value(s) is(are) respectively obtained through P energy detection(s), and the P energy detection(s) is(are) respectively performed in P time sub-pool(s) on the second sub-band; each of the Q energy detection(s) is associated with a first antenna port group; a spatial coverage of a transmitting beam corresponding to any antenna port in the first antenna port group is located within a spatial coverage of a receiving beam corresponding to any of the Q energy detection(s); when each of the P energy detection(s) is associated with the first antenna port group, P is P1; when one of the P energy detection(s) is not associated with the first antenna port group, the P is P2; the P1 and the P2 are unequal positive integers; Q is a positive integer; an antenna port group comprises a positive integer number of antenna port(s); the second node is a UE, or the second node is a base station.

7. The method according to claim 6, wherein each of Q3 detection value(s) among the Q detection value(s) is lower than a first threshold, wherein Q3 is a candidate integer of K1 candidate integer(s), and K1 is a positive integer.

8. The method according to claim 6, wherein the P is the P1, and the P1 is a fixed value, when each of the P detection value(s) is lower than a second threshold, the second radio signal is transmitted at the first instant of time on the second sub-band, otherwise the second radio signal is not transmitted at the first instant of time on the second sub-band; or, the P is the P2, and the P2 is greater than P3, wherein the P3 is a candidate integer of K2 candidate integer(s), when each of P3 detection value(s) among the P detection value(s) is lower than a third threshold, the second radio signal is transmitted at the first instant of time on the second sub-band, otherwise the second radio signal is not transmitted at the first instant of time on the second sub-band, the K2 being a positive integer.

9. The method according to claim 6, comprising:
processing at least one of a first signaling or a second signaling, wherein the first signaling and the second signaling respectively comprise scheduling information of the first radio signal and scheduling information of the second radio signal, the processing is receiving and the second node is a UE, or the processing is transmitting and the second node is a base station.

10. The method according to claim 6, wherein any transmission antenna port of the first radio signal is Quasi Co-Located with an antenna port in the first antenna port group; any transmission antenna port of the second radio signal is Quasi Co-Located with an antenna port in a second antenna port group, and each of the P energy detection(s) is associated with the second antenna port group.

11. A device in a first node for wireless communications, comprising:
a first processor, performing Q energy detection(s) respectively in Q time sub-pool(s) on a first sub-band to obtain Q detection value(s); and determining only based on the Q detection value(s) that a first radio signal is transmitted at a first instant of time on the first sub-band;
a first receiver, performing P energy detection(s) respectively in P time sub-pool(s) on a second sub-band to obtain P detection value(s);
a first transmitter, transmitting a second radio signal at the first instant of time on the second sub-band, or, dropping transmitting the second radio signal at the first instant of time on the second sub-band;
wherein Q is a positive integer; the P detection value(s) is(are) used to determine whether the second radio signal is transmitted at the first instant of time on the second sub-band; and each of the Q energy detection(s) is associated with a first antenna port group; a spatial coverage of a transmitting beam corresponding to any antenna port in the first antenna port group is located within a spatial coverage of a receiving beam corresponding to any of the Q energy detection(s); when each of the P energy detection(s) is associated with the first antenna port group, P is P1; when one of the P energy detection(s) is not associated with the first antenna port group, the P is P2; the P1 and the P2 are unequal positive integers; an antenna port group comprises a positive integer number of antenna port(s); the first node is a base station, or the first node is a UE.

12. The device in the first node according to claim 11, comprising:
a second transmitter, transmitting the first radio signal at the first instant of time on the first sub-band; wherein the Q detection value(s) is(are) used to determine that the first radio signal is transmitted at the first instant of time on the first sub-band, and each of Q3 detection value(s) among the Q detection value(s) is lower than a first threshold, wherein Q3 is a candidate integer of K1 candidate integer(s), and K1 is a positive integer.

13. The device in the first node according to claim 11, comprising:
a second processor, operating at least one of a first signaling or a second signaling;
wherein the first signaling and the second signaling respectively comprise scheduling information of the first radio signal and scheduling information of the second radio signal; the operating is transmitting, and the first node is a base station; or the operating is receiving, and the first node is a UE.

14. The device in the first node according to claim 11, wherein the P is the P1, and the P1 is a fixed value, when each of the P detection value(s) is lower than a second threshold, the second radio signal is transmitted at the first instant of time on the second sub-band, otherwise transmitting of the second radio signal at the first instant of time on the second sub-band is dropped; or, the P is the P2, and the P2 is greater than P3, wherein the P3 is a candidate integer of K2 candidate integers; when each of P3 detection value(s) among the P detection value(s) is lower than a third threshold, the second radio signal is transmitted at the first instant of time on the second sub-band, otherwise transmitting of the second radio signal at the first instant of time on the second sub-band is dropped; the K2 being a positive integer.

15. The device in the first node according to claim 11, wherein any transmission antenna port of the first radio signal is Quasi Co-Located with an antenna port in the first antenna port group; any transmission antenna port of the second radio signal is Quasi Co-Located with an antenna port in a second antenna port group, and each of the P energy detection(s) is associated with the second antenna port group.

16. A device in a second node for wireless communications, comprising:
a second receiver, receiving a first radio signal at a first instant of time on a first sub-band;
a third receiver, monitoring a second radio signal at the first instant of time on a second sub-band;
wherein Q detection value(s) is(are) used to determine that the first radio signal is transmitted at the first instant of time on the first sub-band, the Q detection value(s) is(are) respectively obtained through Q energy detection(s), and the Q energy detection(s) is(are) respectively performed in Q time sub-pool(s) on the first sub-band; P detection value(s) is(are) used to determine whether the second radio signal is transmitted at the first instant of time on the second sub-band, the P detection value(s) is(are) respectively obtained through P energy detection(s), and the P energy detection(s) is(are) respectively performed in P time sub-pool(s) on the second sub-band; each of the Q energy detection(s) is associated with a first antenna port group; a spatial coverage of a transmitting beam corresponding to any antenna port in the first antenna port group is located within a spatial coverage of a receiving beam corresponding to any of the Q energy detection(s); when each of the P energy detection(s) is associated with the first antenna port group, P is P1; when one of the P energy detection(s) is not associated with the first antenna port group, the P is P2; the P1 and the P2 are unequal positive integers; Q is a positive integer; an antenna port group comprises a positive integer number of antenna port(s); the second node is a UE, or the second node is a base station.

17. The device in the second node according to claim 16, comprising:
a third processor, processing at least one of a first signaling or a second signaling, wherein the first signaling and the second signaling respectively comprise scheduling information of the first radio signal and scheduling information of the second radio signal, the processing is receiving and the second node is a UE, or the processing is transmitting and the second node is a base station.

18. The device in the second node according to claim 16, wherein each of Q3 detection value(s) among the Q detection value(s) is lower than a first threshold, wherein Q3 is a candidate integer of K1 candidate integer(s), and K1 is a positive integer.

19. The device in the second node according to claim 16, wherein the P is the P1, and the P1 is a fixed value, when each of the P detection value(s) is lower than a second threshold, the second radio signal is transmitted at the first instant of time on the second sub-band, otherwise the second radio signal is not transmitted at the first instant of time on the second sub-band; or, the P is the P2, and the P2 is greater than P3, wherein the P3 is a candidate integer of K2 candidate integer(s), when each of P3 detection value(s) among the P detection value(s) is lower than a third threshold, the second radio signal is transmitted at the first instant of time on the second sub-band, otherwise the second radio signal is not transmitted at the first instant of time on the second sub-band, the K2 being a positive integer.

20. The device in the second node according to claim 16, wherein any transmission antenna port of the first radio signal is Quasi Co-Located with an antenna port in the first antenna port group; any transmission antenna port of the second radio signal is Quasi Co-Located with an antenna port in a second antenna port group, and each of the P energy detection(s) is associated with the second antenna port group.

* * * * *